(12) United States Patent
Spadacini

(10) Patent No.: US 11,828,203 B2
(45) Date of Patent: Nov. 28, 2023

(54) PLANT AND PROCESS FOR STORING AND DISCHARGING THERMAL ENERGY

(71) Applicant: ENERGY DOME S.P.A., Milan (IT)

(72) Inventor: Claudio Spadacini, Ghiffa (IT)

(73) Assignee: ENERGY DOME S.P.A., Milan (IT)

( * ) Notice: Subject to any disclaimer, the term of this patent is extended or adjusted under 35 U.S.C. 154(b) by 0 days.

(21) Appl. No.: 17/788,265

(22) PCT Filed: Dec. 21, 2020

(86) PCT No.: PCT/IB2020/062272
§ 371 (c)(1),
(2) Date: Jun. 22, 2022

(87) PCT Pub. No.: WO2021/130648
PCT Pub. Date: Jul. 1, 2021

(65) Prior Publication Data
US 2023/0046094 A1 Feb. 16, 2023

(30) Foreign Application Priority Data
Dec. 23, 2019 (IT) .......................... 102019000025261

(51) Int. Cl.
*F01K 3/12* (2006.01)
*F28D 20/00* (2006.01)

(52) U.S. Cl.
CPC ............ *F01K 3/12* (2013.01); *F28D 20/0034* (2013.01); *F28D 2020/0082* (2013.01); *Y02E 60/14* (2013.01)

(58) Field of Classification Search
CPC .................. F01K 3/12; F28D 20/0034; F28D 2020/0082; Y02E 60/14
See application file for complete search history.

(56) References Cited

U.S. PATENT DOCUMENTS

2014/0260246 A1\* 9/2014 Fisher ....................... F03G 7/04
60/659
2018/0106165 A1 4/2018 Barmeier

FOREIGN PATENT DOCUMENTS

| DE | 10 2011 053 349 A1 | 3/2013 |
| WO | WO 2015/136351 A2 | 9/2015 |
| WO | WO 2016/150461 A1 | 9/2016 |

OTHER PUBLICATIONS

International Search Report dated Apr. 7, 2021 in PCT/IB2020/062272 filed on Dec. 21, 2020, 3 pages.

(Continued)

*Primary Examiner* — Mickey H France
(74) *Attorney, Agent, or Firm* — Oblon, McClelland, Maier & Neustadt, L.L.P.

(57) ABSTRACT

A plant for storing and discharging thermal energy comprises a first heat exchanger coupled to a heat source, a second heat exchanger coupled to a heat user, a fluid configured to store thermal energy, a storage device for the fluid, a circuit configured to couple the first heat exchanger, the second heat exchanger and the storage device. The storage device comprises N+B storage sections fluidly connected to each other, where N is equal to or greater than two and B is less than N; each of the N+B storage sections has a same containment volume. The fluid occupies a volume substantially equal to N times the containment volume. A separation gas is inserted in the storage device, is in contact with the fluid and is configured to always keep separate a hot portion of the fluid from a cold portion of the same fluid.

16 Claims, 10 Drawing Sheets

(56) References Cited

OTHER PUBLICATIONS

Written Opinion dated Apr. 7, 2021 in PCT/IB2020/062272 filed on Dec. 21, 2020, 6 pages.

\* cited by examiner

PLANT AND PROCESS FOR STORING AND DISCHARGING THERMAL ENERGY

FIELD OF THE FINDING

The object of the present invention is a plant and a process for storing and discharging thermal energy. More precisely, the object of the present invention is a system capable of storing thermal energy that exploits the sensible heat of a fluid substance, so that the energy that is administered to the fluid causes an increase of its temperature and preferably not a phase change.

The present invention is situated in the field of medium-scale or large-scale thermal energy storage systems (Thermal Energy Storage or TES), for both land and marine applications, typically with thermal powers from hundreds of kW up to tens of MW (e.g. 20-25 MW), but even hundreds of MW, and with storage capacity ranging from a few hundred kWh, up to hundreds of MWh and even up to several GWh. The present invention can also be situated in the field of small-scale energy storage systems for home and commercial applications, both land and marine, typically with thermal powers ranging from a few kW up to several hundred kW and with storage capacity ranging from a few kWh up to hundreds of kWh.

BACKGROUND OF THE FINDING

The global problem of 'Climate Change' is by now recognized worldwide, and likewise it is agreed that the radical solution of such problem must pass through the de-carbonization of the planet. In other words, $CO_2$ introductions into the atmosphere must be ceased and possibly $CO_2$ will also have to be absorbed from the atmosphere in order to reduce the concentration thereof. The objective of the decarbonization passes through the use of renewable resources, both for electrical energy and heat.

With regard to the use and distribution of thermal energy, increasingly efficient and advantageous systems are in use and are increasingly necessary for storing the same energy in thermal form. This new technology thus first sets this objective, i.e. of making it increasingly advantageous to use renewable sources such as the sun, the geothermal heat, the biomasses etc., but also the heat from electrical energy dissipation generated in a renewable manner and/or of "waste heat recovery" for distribution and use of thermal energy both for civil and industrial use.

With regard instead to the electrical industry, due to the need to decarbonize, recently systems for producing energy from renewable sources have been increasingly widespread, in particular from wind and photovoltaic sources, which are characterized by variability and unpredictability of production; electrical energy storage systems are taking on increasingly greater importance. Alongside the systems which function according to electrochemical principles (batteries), which typically have high costs and limited useful lifetime, or mechanical principles (flywheels), suitable for only small quantities of accumulated energy, systems are known for storing the electrical energy according to thermodynamic processes that thus also use energy storages in the form of thermal energy.

The present new technology is set to make such electrical energy storage systems increasingly more efficient and more advantageous.

In addition, still in order to contribute to the carbonization, there is constant research and need for systems which can produce energy that is "renewable" but "dispatchable", i.e. which can appear as a form of energy that is programmable and hence "dispatchable". In such sense, thermodynamic solar plants are a potential candidate and also these provide for the use of forms of storage of thermal energy. The latter can also be seen as a sub-case of the point relative to the storage of thermal energy; they can be provided as thermal energy storage systems for thermal use, as well as for "dispatchable" electrical energy production use.

Use examples of such systems are the balancing of the energy request between day and night, the conservation of the summer heat for the winter heating or of the winter cold for the summer climate control (seasonal storage of thermal energy). Other uses of systems for storing thermal energy include the heat produced by renewable electrical energy which exceeds the grid request and/or the discard heat of industrial processes. The heat storage, both seasonable and short-term, is considered an important means for inexpensively balancing high levels of variable renewable electricity production and the integration in the energy systems that are nearly or completely powered by renewable energy. The systems for storing thermal energy are made with very different technologies. Depending on the specific technology, it is possible to store the excess thermal energy and use it in the subsequent hours, days or months.

Systems are known which exploit the sensible heat of a fluid, such as pressurized water, molten salt or oil. The heat stored is proportional to the temperature difference, to the specific heat of the fluid and to the mass of the same.

The enclosed FIGS. 22A and 22B schematically illustrate a known system (prior art) of such type, respectively in a thermal energy storage phase (system charge phase) and in thermal energy release phase (system discharge phase). The system is composed of heat exchangers E in order to heat the fluid from an initial temperature $T_0$ to a final temperature $T_1$, receiving the heat from one or more sources, a system of pipes and pumps for moving the fluid between the source(s), one or more users, a thermal storage system and a further system of exchangers in order to transfer the heat to one or more users. In FIG. 22A, the system is in a phase of exploiting the heat coming from the source S, requested by the user U, and simultaneously the storage of the excess heat occurs in the thermal accumulator A; the storage system is being "charged". In FIG. 22B, the source S is unable to meet the heat request by the user U (even partially, here the source absence case is represented), and in this case the user U exploits the accumulated heat in the thermal accumulator A, hence the thermal storage system is being "discharged". The thermal accumulator A of known type illustrated in FIGS. 22A and 22B comprises two tanks that are thermally independent, each capable of storing the entire mass of the fluid dedicated for storing thermal energy (one excludes the fluid within the system of pipes and exchangers). The volume of the storage tanks is therefore double that of the fluid in its maximum specific volume state (lower density), which already per se must be high if it is desired to store a high quantity of thermal energy.

Also known are thermal accumulators which comprise a single tank and exploit the vertical temperature gradient. Normally, the higher temperature fluid is kept in the upper part, given that it would ascend upward due to the lower density. Such thermal accumulators allow, with respect to the use of two tanks, decreasing the volumes necessary, to the detriment of the system efficiency due to the mixing between fluid at higher temperature and fluid at lower temperature.

Also known is the public document WO 2015/136351 A2 which illustrates a method for producing power which follows the load by using heat with low or medium temperature, in which provision is made for: reducing the level of power produced by an ORC plant by producing power that operates on a low or medium temperature heat source during a first time period, storing the heat not used in the first time period and then using the stored heat in order to produce power at a later/second time period. WO 2015/136351 A2 illustrates a closed storage cycle which uses an array of storage tanks for water or thermal oil and which uses pressurized inert gas in order to prevent the liquid from evaporating when one or more tanks are only partially filled.

Also the documents WO 2016/150461 and DE 10 2011 053 349 illustrate systems/plants for storing energy in the form of thermal energy of a work fluid.

SUMMARY

The Applicant has observed that the present thermal energy storage systems which exploit the sensible heat of a fluid are costly and/or not very efficient.

In particular, the Applicant has observed that the use of molten salt or oil involves a high cost related to the materials used.

The Applicant has further observed that the water must be pressurized such that it can be used at a temperature usually higher than 90° C. and that the pressures necessary for such types of applications are tens of bars. It follows that the tanks must consequently be sized and result quite bulky, heavy, due to the high thickness, and costly.

Assuming the use of the three abovementioned substances in order to store heat for 100 MWt for 10 hours, the heat to be stored will be equal to 3.6e6 MJ, exploiting a DT equal to 150° C. (from 90° C. to 240° C.), with the use of a system with two tanks, and there will be the values of the following Tables 1 and 2.

TABLE 1

| Substance | Cp_average (@165° C.) [kJ/kg-K] | Mass [Ton] | Density [kg/m3] | Fluid volume [m3] |
|---|---|---|---|---|
| Oil | 2.2 | 10909.1 | 890 | 12257 |
| Water | 4.19 | 5727.9 | 813.7 | 7039 |
| Molten salt | 1.65 | 14545.5 | 1550 | 9384 |

TABLE 2

| Substance | Fluid cost specification [€/Ton] | Mass [Ton] | Fluid cost [M€] | Tank weights [Ton] | Tank specific cost [€/Ton] | Tank cost [M€] | Total cost [M€] |
|---|---|---|---|---|---|---|---|
| Oil | 4000 | 10909 | 43.6 | 708 | 4000 | 2.8 | 46.5 |
| Water | 1 | 5728 | 0.0 | 6300 | 4000 | 25.2 | 25.2 |
| Molten salt | 1000 | 14545 | 14.5 | 888 | 4000 | 3.6 | 18.1 |

With the use of a thermal accumulator with single tank (with volume equal to that of the fluid normally increased by 25-30%), the values are those of the following Table 3.

TABLE 3

| Substance ×130% | Fluid specific cost [€/Ton] | Mass [Ton] | Fluid cost [M€] | Tank weight [Ton] | Tank specific cost [€/Ton] | Tank cost [M€] | Total cost [M€] |
|---|---|---|---|---|---|---|---|
| Oil | 4000 | 14182 | 56.7 | 460 | 4000 | 1.8 | 58.6 |
| Water | 1 | 7446 | 0.0 | 4095 | 4000 | 16.4 | 16.4 |
| Molten salt | 1000 | 18909 | 18.9 | 577 | 4000 | 2.3 | 21.2 |

If follows that the least expensive system is the one using molten salt if the tanks are independent, while it is that with pressurized water if there is a single tank.

The Applicant has however also observed that the fluid in the single tank must be exploited "completely" and "quickly" otherwise, with the passage of time, the action of remixing will involve having the entire mass at an intermediate temperature, drastically decreasing the efficiency.

In such context, the Applicant has set the objective of ideating and making a plant and a process for storing and discharging thermal energy which exploit the sensible heat of a fluid substance, i.e. a "thermal energy storage", which are more efficient and also less expensive than those known.

In particular, the Applicant has set the objective of ideating and making a plant and a process for storing and discharging thermal energy which allow containing the volume necessary for storage.

The Applicant has found that the above-indicated objectives and still others can be achieved by means of a system operating by means of N+B independent storage sections, where N is greater than or equal to two and B is less than N. In other words, the idea provides for dividing the necessary volume into N smaller volumes, which we will call sections, where N is equal to or greater than two, in addition to a dead volume with volume substantially equal to one or more sections.

In particular, the above-indicated objectives and still others are substantially reached by a plant and by a process for storing energy of the type claimed in the enclosed claims and/or described in the following aspects.

In an independent aspect, the present invention regards a plant for storing and discharging thermal energy, comprising:

at least one heat exchanger operatively coupled or capable of being coupled to at least one heat source and/or to at least one heat user; optionally at least one first heat exchanger operatively coupled or capable of being coupled to at least one heat source and at least one second heat exchanger operatively coupled or capable of being coupled to at least one heat user;

a fluid configured to store thermal energy;

a storage device for the fluid;

a circuit configured to couple said at least one heat exchanger, optionally the first heat exchanger and the second heat exchanger, and said at least one storage device;

control elements operatively coupled to the circuit and/or to said at least one storage device and configured to move the fluid, within said at least one heat exchanger, optionally the first heat exchanger and the second heat exchanger, and the storage device, optionally without phase change;

wherein, in a storage phase in which the heat source transfers heat to said at least one heat exchanger, optionally to the first heat exchanger, the fluid receives said heat through said at least one heat exchanger, optionally through the first heat exchanger, heats up to a higher temperature and is stored in said at least one storage device as hot fluid;

wherein, in a discharge phase in which the heat source does not produce heat or does not produce enough heat, the fluid transfers the accumulated heat through said at least one heat exchanger, optionally through the second heat exchanger, to the heat user, cools down to a lower temperature and is stored in said at least one storage device as cold fluid;

wherein said storage device comprises N+B storage sections, where N is equal to or greater than two and B is less than N; each of said N+B storage sections having substantially a same containment volume, wherein said N+B storage sections are fluidly connected to each other;

a separation gas inserted in the storage device; wherein the fluid occupies a volume substantially equal to N times the containment volume; wherein said separation gas is in contact with the fluid and always separates, or is configured to keep always separated, the hot fluid from the cold fluid.

In an independent aspect, the present invention regards a storage device for a plant for storing and discharging thermal energy, comprising: N+B storage sections for a fluid configured to store thermal energy, where N is equal to or greater than two and B is less than N; each of said $N_+B$ storage sections having substantially a same containment volume, wherein said $N_+B$ storage sections are fluidly connected to each other;

a separation gas inserted in the storage device; wherein the fluid occupies a volume substantially equal to N times the containment volume; wherein said separation gas is in contact with the fluid and always separates, or is configured to keep always separated, the hot fluid from the cold fluid.

In an independent aspect, the present invention regards a process for storing and discharging thermal energy, optionally actuated through the plant according to the preceding aspect or according to at least one of the following aspects.

The process comprises: preparing N+B storage sections connected to each other, where N is equal to or greater than two and B is less than N; each of said N+B storage sections having substantially a same containment volume, wherein said N+B storage sections are fluidly connected to each other; wherein a fluid is placed in the storage sections and occupies a volume substantially equal to N times the containment volume, wherein a separation gas is placed in the storage sections; wherein, in a storage phase, the process comprises: passing the fluid through at least one heat exchanger, optionally through a first heat exchanger, operatively coupled to at least one heat source in order to heat the fluid; introducing at least part of the heated fluid in a storage section of said N+B storage sections and simultaneously extracting, from one of the other storage sections, cold fluid contained in said storage section, wherein said separation gas is in contact with the hot fluid and with the cold fluid and maintains separated the hot fluid from the cold fluid; wherein, during the introduction of the heated fluid in said storage section, the separation gas flows into said one of the other storage sections from which the cold fluid has been extracted; conveying the cold fluid exiting from said one of the other storage sections into said at least one exchanger, optionally into the first exchanger. In a discharge phase, the process comprises: extracting the accumulated hot fluid from one of the storage sections; conveying the hot fluid through said at least one heat exchanger, optionally through a second heat exchanger, in order to transfer heat to at least one heat user; introducing the cooled fluid just passed through said at least one heat exchanger, optionally through the second heat exchanger, in one of the other storage sections; wherein, during the introduction of the cooled fluid in said one of the other storage sections, the separation gas flows into said one of the storage sections from which the hot fluid has been extracted.

The Applicant has verified that the process and the apparatus according to the invention allow obtaining the pre-established objectives.

The Applicant has verified that the invention allows reducing the overall volume and consequently the overall weight of the tanks.

In particular, the Applicant has verified that the invention allows reducing the cost of the apparatus given the same quantity of fluid required.

The Applicant has verified that the invention allows maximizing the efficiency, as in the case of the two independent tanks, maintaining overall volumes that are even smaller than the known system with single tank.

Aspects of the invention are listed hereinbelow.

In one aspect, the separation gas always occupies a same dead volume during the process and/or the operation of the plant.

In one aspect, the separation gas occupies a dead volume substantially equal to the containment volume of a section.

In one aspect, the separation gas is at a pressure necessary for maintaining the fluid in the liquid phase in all the work conditions. The separation gas has function both of batching and buffering, in order to maintain constant the pressure pressing on the free surfaces of the fluid.

In one aspect, N is greater than three, optionally equal to or greater than ten, optionally N is comprised between ten and twenty. In this manner, it is possible to obtain an overall volume lower than that of the apparatuses with single tank but with an efficiency equal to that of the systems with two independent tanks.

In one aspect, B is equal to one. Having only one section as dead volume (B=1) serves to minimize the ratio between the volume of the tanks and the volume of the fluid.

Indeed, each of the N sections will have a containment volume V equal to the total volume of the fluid divided by the number N of the sections: V=V_fluid/N. In addition to the volume of the N sections, the dead volume B will be equal to the volume of a section (since B=1, only one dead volume). The storage device will therefore have an overall volume equal to $V_{tot}=(N+1)*V$ with an oversizing (extra-volume) equal to $((N+1)/(N))-1=1/N$. In the following Table 4, the extra-volumes with the increase of N are reported.

TABLE 4

| N | 2 | 3 | 4 | 5 | 10 | 15 | 20 |
|---|---|---|---|---|----|----|----|
| B | 1 | 1 | 1 | 1 | 1 | 1 | 1 |
| Extra_volume | 50% | 33% | 25% | 20% | 10% | 7% | 5% |

In one aspect, all the N+B storage sections are identical to each other.

In one aspect, the fluid in a condition thereof at lower density occupies a volume equal to N sections.

In one aspect, each storage section comprises a single tank or it is defined by a single tank.

In one aspect, each storage section comprises a plurality of tanks that are connected to each other, optionally without interception valves.

In one aspect, each tank has elongated form, optionally substantially cylindrical.

In one aspect, the tanks are vertically oriented.

In one aspect, each tank has spherical form.

In one aspect, the tanks of a storage section are mutually connected in series and/or in parallel.

In one aspect, the tanks of a storage section are connected to the tanks of a different storage section by means of at least one shared connection.

In one aspect, the storage sections and/or the tanks are connected at a same geodetic height.

In one aspect, each storage section has at least one lower inlet/outlet opening connected to the other storage sections and at least one upper inlet/outlet opening connected to the other storage sections.

In one aspect, the control elements are configured to determine the passage of the fluid (both in inlet and in outlet) through said at least one lower inlet/outlet opening and to determine the passage of the gas (both in inlet and in outlet) through said at least one upper inlet/outlet opening.

In one aspect, provision is made for introducing and extracting the fluid from the bottom into/from each storage section.

In one aspect, provision is made for introducing and extracting the gas from the top into/from each storage section.

The fluid exits from each storage section or enters into each storage section (as a function of the operating step) always from the bottom through said one or more lower inlet and outlet openings situated on the lower part on each storage section.

The gas exits from each storage section or enters into each storage section (as a function of the operating step) always from the top through one or more upper inlet and outlet openings situated on the upper part on each storage section.

In one aspect, the lower inlet/outlet openings are connected to said circuit.

In one aspect, the circuit comprises a hot branch configured to make the hot fluid flow and a cold branch configured to make the cold fluid flow.

In one aspect, said at least one heat exchanger comprises a single heat exchanger.

In one aspect, the hot branch is extended between the single heat exchanger and a first inlet/outlet of the storage device and the cold branch is extended between the single heat exchanger and a second inlet/outlet of the storage device.

In one aspect, the hot branch is connected to an outlet of the first heat exchanger and to an inlet of the second heat exchanger, the cold branch is connected to an inlet of the first heat exchanger and to an outlet of the second heat exchanger.

In one aspect, the storage device has a first inlet/outlet connected to the hot branch, optionally between the first and the second heat exchanger, and a second inlet/outlet connected to the cold branch, optionally between the first and the second heat exchanger.

In one aspect, the lower inlet/outlet openings are connected to a cold branch of the circuit and to a hot branch of the circuit.

In one aspect, the storage device has a first main inlet/outlet connected to a hot branch of the circuit and a second main inlet/outlet connected to a cold branch of the circuit, wherein the first main inlet/outlet and the second main inlet/outlet are in fluid communication with the lower inlet/outlet openings of the storage sections.

In one aspect, a pump is situated on the cold branch.

In one aspect, the cold branch has diverter devices configured to make the fluid flow through said cold branch from the storage device towards the heat exchanger or from the heat exchanger towards the storage device.

In one aspect, a first pump is situated on the cold branch between the second main inlet/outlet and the first exchanger and a second pump is situated on the cold branch between the second exchanger and said second main inlet/outlet.

In one aspect, each storage section has a first lower inlet/outlet opening and a second lower inlet/outlet opening.

In one aspect, the first lower inlet/outlet opening is connected to a hot branch of the circuit and the second lower inlet/outlet opening is connected to a cold branch of the circuit.

In one aspect, the storage device comprises a plurality of valves for the hot fluid and a plurality of valves for the cold fluid, wherein each valve for the hot fluid is operatively associated with each of said first lower inlet/outlet openings and each valve for the cold fluid is operatively associated with each of said second lower inlet/outlet openings.

In one aspect, the first lower inlet/outlet openings are in fluid communication with the first main inlet/outlet and the second lower inlet/outlet openings are in fluid communication with the second main inlet/outlet.

In one aspect, each storage section has a single lower inlet/outlet opening.

In one aspect, the plant comprises a plurality of first valves and a plurality of second valves.

In one aspect, a first valve is operatively associated with each lower inlet/outlet opening.

In one aspect, all the lower inlet/outlet openings are connected to a single section of the circuit.

In one aspect, the second valves are operatively associated with said single section and each second valve is operatively interposed between two subsequent lower inlet/outlet openings.

In one aspect, said single section forms, between one storage section and the next, a siphon.

In one aspect, the siphon comprises an ascending section, a descending section and an upper curved connector.

In one aspect, the siphon has a height greater than a height of the storage sections.

In one aspect, the plant comprises a plurality of gas valves, each operatively interposed between the upper inlet/outlet openings of adjacent storage sections.

In one aspect, the storage device comprises a distributor valve.

In one aspect, all the lower inlet/outlet openings are connected to the distributor valve.

In one aspect, the distributor valve is connected to a hot branch and to a cold branch of the circuit.

In one aspect, the distributor valve is configured to selectively place in fluid communication a hot branch of the circuit with a storage section and a cold branch of the circuit with a different storage section.

In one aspect, in the storage phase, the distributor valve is configured to place in fluid communication, one after the other, the storage sections with a hot branch of the circuit.

In one aspect, in the discharge phase, the distributor valve is configured to place in fluid communication, one after the other, the storage sections with a cold branch of the circuit.

In one aspect, the distributor valve is rotary or linear.

In one aspect, the distributor valve comprises a fixed body comprising N+B inlets/outlets connected to the N+B sections, an inlet/outlet connected to the hot branch and an inlet/outlet connected to the cold branch.

In one aspect, the distributor valve comprises a body movable with respect to the fixed body, wherein the movable body has internal volumes/ducts configured to place in fluid communication one of said N+B inlets/outlets with the inlet/outlet connected to the hot branch and another of said N+B inlets/outlets with the inlet/outlet connected to the cold branch.

In one aspect, a distance between two successive inlets/outlets of said N+B inlets/outlets is such to prevent the hot fluid and the cold fluid from being mixed.

In one aspect, the internal volumes/ducts comprise a first and a second internal chamber/duct/volume that are separate from each other.

In one aspect, provision is made for compensating for volume variations of the fluid due to the different temperature.

In one aspect, provision is made for loading or discharging in part the separation gas into/from the storage device in order to compensate for the volume variations of the fluid, maintaining constant the pressure of the compensation gas.

In one aspect, provision is made for loading or discharging in part the fluid into/from the storage sections in order to compensate for the volume variations of said fluid.

In one aspect, the storage device comprises a compensation tank connected to a branch of the circuit with the fluid at higher density and configured to compensate for a different volume of the fluid at different temperatures.

In one aspect, the compensation tank is connected to the cold branch of the circuit.

In one aspect, the compensation tank is connected at the second inlet/outlet of the storage device.

In one aspect, a compensation circuit connects the compensation tank to the branch of the circuit with the fluid at higher density.

In one aspect, the compensation circuit comprises a pump and a discharge valve.

In one aspect, the compensation circuit comprises a turbine, in which the turbine is configured to recover part of the electrical energy expended by the pump.

In one aspect, the compensation circuit comprises a first branch provided with the discharge valve and, optionally, of the turbine and a second branch provided with the pump.

In one aspect, in the storage phase, the discharge valve is open for introducing in the compensation tank the cold fluid at higher density exiting from one of the N+B storage sections while the hot fluid at lower density is introduced in another of the N+B storage sections.

In one aspect, in the storage phase, the turbine is actuated by the cold fluid flowing towards the compensation tank.

In one aspect, in the discharge phase, the pump operates in order to pick up, from the compensation tank, the cold fluid at higher density and introduce it into one of the N+B storage sections while the hot fluid at lower density is extracted from another of the N+B storage sections.

In one aspect, the fluid is liquid in the work conditions of the plant/process.

In one aspect, the fluid is water.

In one aspect, the water is heated to a temperature higher than 90°.

In one aspect, the water is at a pressure greater than the atmospheric pressure, optionally greater than 2 bar, optionally greater than 30 bar, for example 36 bar.

In one aspect, the separation gas is an inert gas, optionally selected from the group comprising: nitrogen, helium, argon, carbon dioxide, neon.

In one aspect, the separation gas is a non-inert gas.

In one aspect, the separation gas is at a pressure higher than the fluid saturation pressure that is reached at the maximum work temperature of the storage device.

In one aspect, the heat source is solar.

In one aspect, the heat user is a machine for producing electrical energy, optionally an Organic Rankine Cycle (ORC) machine for producing electrical energy.

In one aspect, the present invention regards an apparatus for generating electrical energy comprising: a solar plant, a plant for storing and discharging thermal energy operatively coupled to the solar plant, a machine for producing electrical energy operatively coupled to the plant for storing and discharging thermal energy, wherein the plant for storing and discharging thermal energy is and/or operates in accordance with one or more of the preceding aspects.

In one aspect, the solar plant comprises a plurality of reflecting mirrors, a tower and a receiver placed on the tower, wherein the reflecting mirrors are configured to concentrate the solar rays on the receiver.

In one aspect, the present invention regards an apparatus for storing electrical energy (storage), also termed thermal battery, comprising: a plant which consumes electrical energy and produces thermal energy (when it is charged from a source) and is capable of producing electrical energy by consuming thermal energy (when it is discharged by a user), a plant for storing and discharging thermal energy operatively coupled to the thermal battery, wherein the plant for storing and discharging thermal energy is and/or operates in accordance with one or more of the preceding aspects.

Further characteristics and advantages will be more evident from the detailed description of preferred but not exclusive embodiments of a plant and of a process for storing and discharging thermal energy in accordance with the present invention.

DESCRIPTION OF THE DRAWINGS

Such description will be set forth hereinbelow with reference to the enclosed drawings, provided only as a non-limiting example, in which.

DETAILED DESCRIPTION

Figure 1:
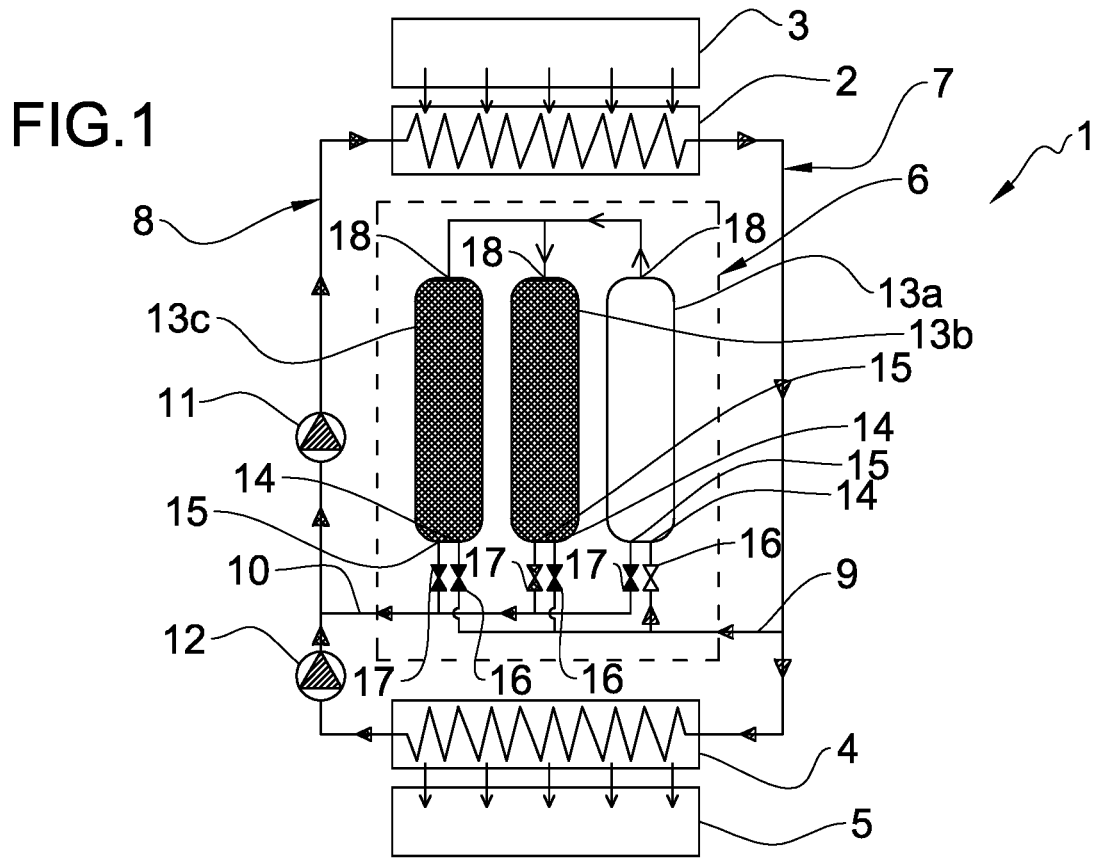
FIG. 1 schematically illustrates an embodiment of a plant for storing and discharging thermal energy according to the present invention in a storage configuration.

With reference to the enclosed figures, reference number 1 overall indicates a plant for storing and discharging thermal energy (thermal energy storage) according to the present invention.

The plant 1 illustrated in FIGS. 1 to 6 comprises a first heat exchanger 2 operatively coupled or capable of being coupled to a heat source 3, a second heat exchanger 4 operatively coupled or capable of being coupled to a heat user 5 and a storage device 6 operatively interposed between the first and the second heat exchanger 2, 4. A circuit formed by pipes is configured to couple the first heat exchanger 2, the second heat exchanger 4 and the storage device 6. A fluid F configured to store thermal energy and to transfer it is arranged in the plant 1. Such fluid F is for example water maintained at a pressure of tens of bars, e.g. at 36 bar, in order to be able to heat without changes of state up to a temperature higher than 90° C. For such purpose, control elements (such as pumps and valves) are operatively coupled to the circuit and/or to the storage device 6 and are configured to move the fluid, within the first heat exchanger 2, the second heat exchanger 4 and the storage device 6 without the fluid F changing state. The circuit of the plant 1 of FIG. 1 comprises a hot branch 7 which is extended from an outlet of the first heat exchanger 2 towards an inlet of the second heat exchanger 4 and a cold branch 8 which is extended from an outlet of the second heat exchanger towards an inlet of the first heat exchanger 2. The circuit is extended within or is part of the first and second heat exchanger 2, 4 so as to define a closed path.

The storage device 6 is in fluid F connection with the circuit by means of a first main inlet/outlet 9 connected to the hot branch 7 and a second main inlet/outlet 10 connected to the cold branch 8. A first pump 11 is situated on the cold branch 8 between the second main inlet/outlet 10 and the first exchanger 2 and a second pump 12 is situated on the cold branch 8 between the second exchanger 4 and the second main inlet/outlet 10.

The heat source 3 can be a solar plant for example of tower type. Such plant, which can also be per se known, comprises a plurality of reflecting mirrors, a tower and a receiver placed on the tower, wherein the reflecting mirrors are configured for concentrating the solar rays on the receiver. The solar plant therefore receives heat from the solar rays during the daytime hours or part thereof. The heat user 5 can be a machine for producing electrical energy, such as for example an Organic Rankine Cycle (ORC) machine. Such machine, which can also be per se known, comprises an expansion turbine connected to an electric generator, a pump, a condenser connected by a closed circuit into which an organic fluid flows. The circuit of the Organic Rankine Cycle machine is also coupled to the second heat exchanger 4.

The second heat exchanger can be an assembly of exchangers, such as for example an assembly formed by preheater and evaporator or an assembly formed by preheater, evaporator and superheater.

The solar plant, the Organic Rankine Cycle machine and the plant for storing and discharging thermal energy 1 form an apparatus for generating electrical energy that is also part of the present invention.

During the daytime hours, the heat of the solar rays captured by the solar plant (heat source 5) is transferred to the first heat exchanger 2. The device 1 is in a configuration/storage phase (FIG. 1) which will be described below in the present description. The fluid F receives such heat and heats up to a higher temperature $T_{max}$. The first and the second pump 11, 12 are both in operation. Part of the heated fluid flows into the second heat exchanger 4 where it transfers heat to the organic fluid of the Organic Rankine Cycle machine. The heat transferred by the fluid F of the plant 1 into the second heat exchanger 4 heats and evaporates the organic fluid of the Organic Rankine Cycle machine. The expansion turbine is fed with the organic fluid in vapor phase exiting from the second heat exchanger 4 and achieves a conversion of the thermal energy present in the organic fluid into mechanical energy according to a Rankine cycle. The organic fluid exiting from the turbine is condensed in the condenser, sent to the pump and then fed once again to the second heat exchanger. Another part of the hot fluid is accumulated in the storage device 6 as hot fluid.

Figure 6:
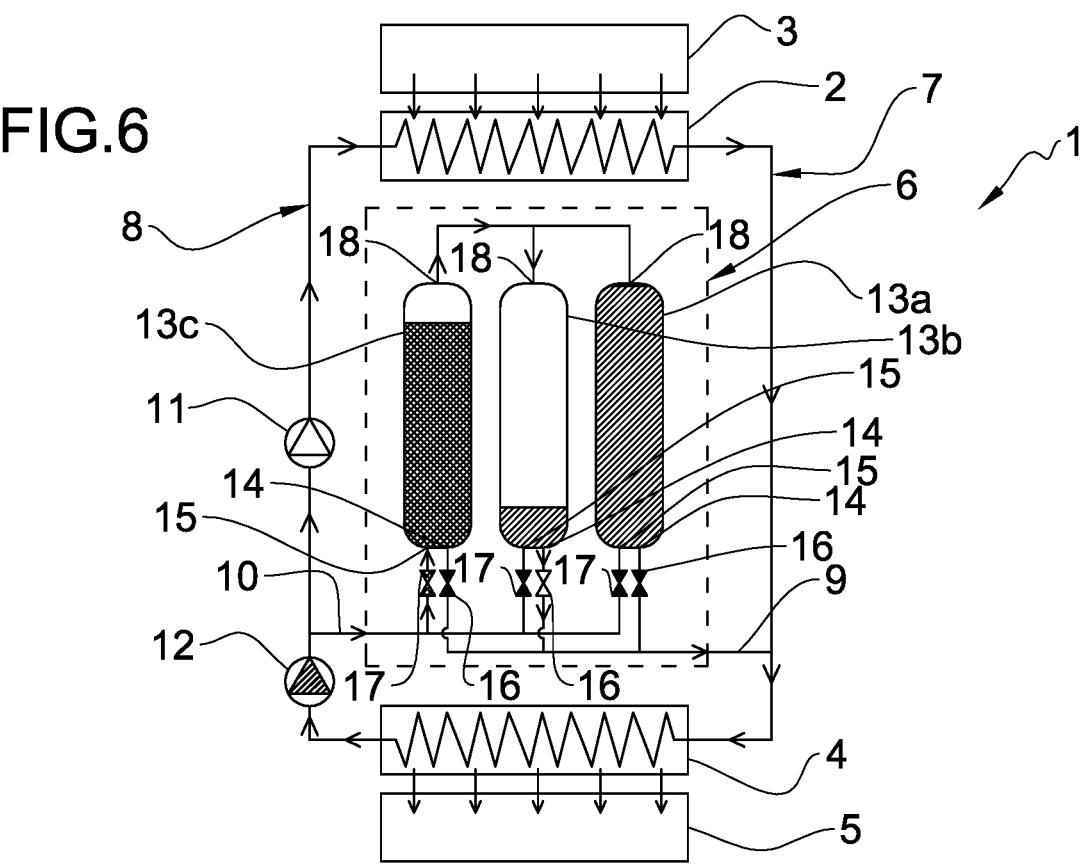
FIG. 6 illustrates the plant of FIG. 1 in a discharge configuration.

During the nighttime hours, or in any case in the absence of sufficient solar irradiation, the device 1 is in a configuration/discharge phase (FIG. 6). The first pump 11 is stopped or has reduced load while the second pump 12 is active. In such configuration, the heat source 3 does not produce heat or it does not produce a sufficient quantity thereof to meet the request, the fluid F transfers the accumulated heat in and coming from the device 1, through the second heat exchanger 4, to the heat user 5 (i.e. to the Organic Rankine Cycle machine which therefore continues working), cools down to a lower temperature $T_{min}$ and is once again accumulated in the storage device 6 as cold fluid.

The present invention also comprises said thermal battery (apparatus for storing electrical energy) which comprises a plant that consumes electrical energy and produces thermal energy (when it is charged from a source) and is capable of producing electrical energy by consuming thermal energy (when it is discharged by a user), a plant for storing and discharging thermal energy operatively coupled to the thermal battery, wherein the plant for storing and discharging thermal energy is and/or operates in accordance with one of those described and illustrated herein.

The storage device 6 of the embodiment of FIGS. 1-6 according to the present invention comprises three storage sections (N=2 and B=1), each defined by a single tank (first, second and third tank 13a, 13b, 13c). The three tanks 13a, 13b, 13c are identical to each other and each have an elongated cylindrical form and a same containment volume. The three tanks 13a, 13b, 13c are side-by-side each other, oriented vertically and arranged at a same geodetic height. Each tank 13a, 13b, 13c has a first lower inlet/outlet opening 14 and a second lower inlet/outlet opening 15 situated at a lower portion of the tank itself. The first lower inlet/outlet openings 14 are connected in parallel to a single section of the circuit in turn communicating with the first main inlet/outlet 9 and with the hot branch 7 of the circuit. The second lower inlet/outlet openings 15 are connected in parallel to a single section of the circuit in turn communicating with the second main inlet/outlet 10 and with the cold branch 8 of the circuit. The first lower inlet/outlet openings 14, the second lower inlet/outlet openings 15 are arranged at a same geodetic height. Each first lower inlet/outlet opening 14 is coupled with a valve for the hot fluid 16 and each second lower inlet/outlet opening 15 is coupled with a valve for the cold fluid 17.

In addition, each tank is provided with an upper inlet/outlet opening 18 connected to the other two tanks. In the example of FIGS. 1-6, valves are not present on the ducts that connect together the abovementioned upper inlet/outlet openings 18. The upper inlet/outlet openings 18 are arranged at a same geodetic height. The storage device 6 contains, in addition to the fluid F configured to store thermal energy (e.g. pressurized water), a separation gas G such as, for example, nitrogen. In the example of FIGS. 1-6, the storage device 6 contains a volume of water substantially equal to twice the containment volume V of each tank and a volume of nitrogen substantially equal to the containment volume V of a single tank. The nitrogen is placed in one or two adjacent tanks and possibly in the pipes which connect the upper inlet/outlet openings 18 as a function of the work phase of the plant 1, is in contact with the water and always separates the hot water from the cold water. The nitrogen is at a pressure necessary (e.g. the abovementioned 36 bars) for maintaining the water in liquid phase in all work conditions. More generally, the pressure must be greater than the pressure of saturation of the fluid which takes place at the maximum work temperature of the storage device. Thus the pressure depends on the temperature and on the type of fluid.

Figures 2, 3:
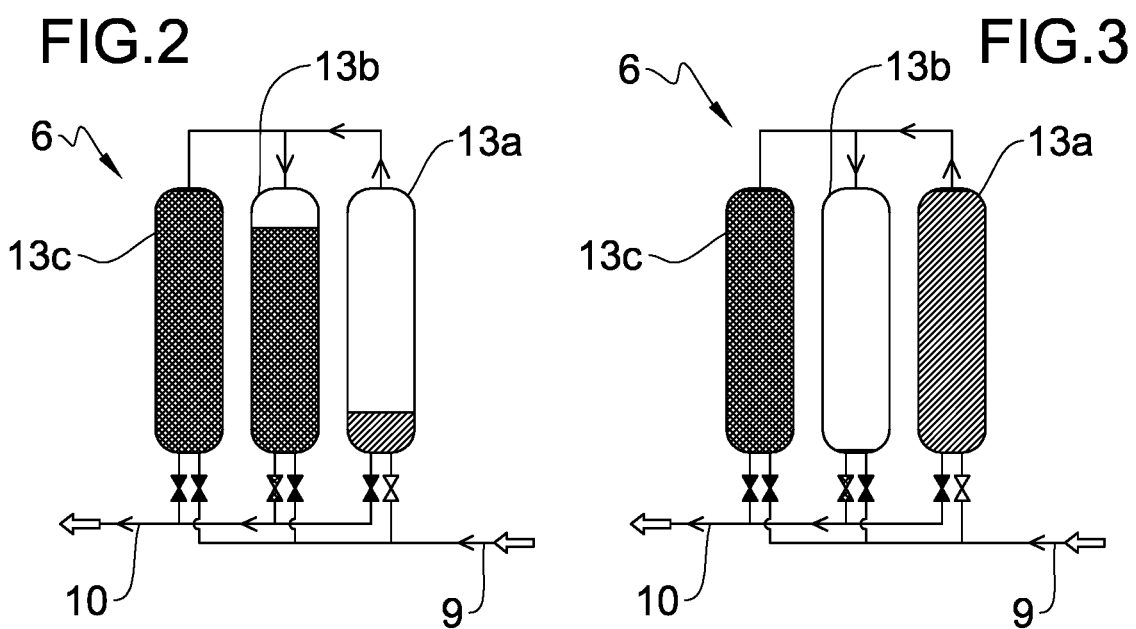
FIGS. 2, 3 and 4 illustrate a storage device of the plant of FIG. 1 in successive storage phases.

FIG. 1 illustrates the plant 1 in the configuration/storage phase starting from an initial instant in which cold water fills the second and the third tank 13b, 13c while the first tank 13a, closer to the hot branch 7, is full of nitrogen. As can be observed, the nitrogen also fills the pipes that connect the upper inlet/outlet openings 18 and maintains constant the pressure pressing on the free surfaces of the water in the respective tanks 13c, 13b. The valve for the hot fluid 16 of the first tank 13a is open, the valve for the cold fluid 17 of the second tank 13b is open while the remaining valves for the hot fluid and cold fluid 16, 17 are closed. In accordance with the process according to the invention, the hot water coming from the first heat exchanger 2 that flows through the first main inlet/outlet 9 enters through the first lower inlet/outlet opening 14 of the first tank 13a. The nitrogen contained in the first tank 13a is progressively moved into the second tank 13b through the pipes that connect the upper inlet/outlet openings 18 (FIG. 2). The cold water contained in the second tank 13b exits from the second lower inlet/outlet opening 15 of the second tank 13a and hence exits from the second main inlet/outlet 10 up to complete emptying of the water. The first tank 13a is full of hot water and the second tank 13b is full of nitrogen (FIG. 3).

Figure 4:
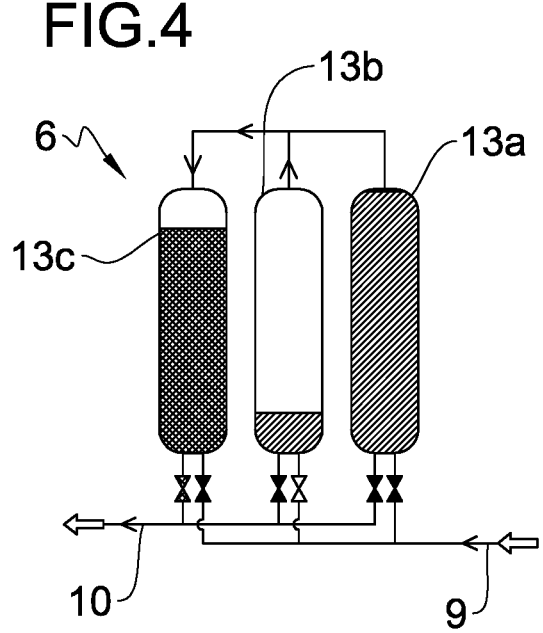

At this point, the valve for the hot fluid 16 of the second tank 13b is opened, the valve for the cold fluid 17 of the third tank 13c is opened while the remaining valves for the hot fluid and cold fluid 16, 17 are closed (FIG. 4).

Figure 5:
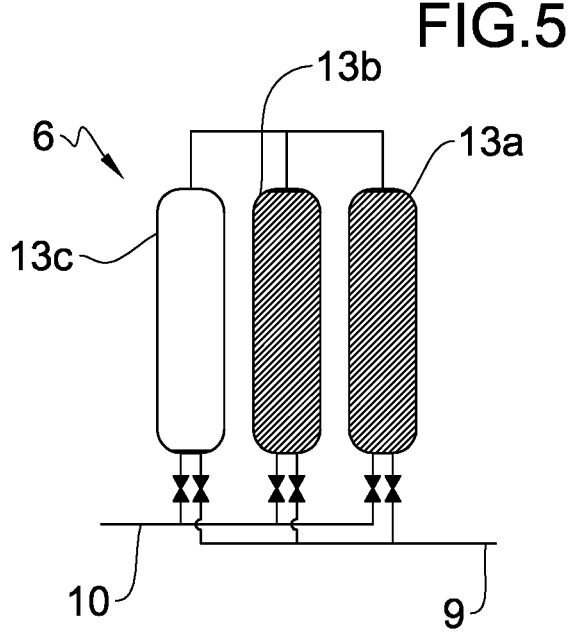
FIG. 5 illustrates the storage device of FIGS. 2, 3 and 4 in a static phase.

The hot water coming from the first heat exchanger 2 that flows through the first main inlet/outlet 9 enters through the first lower inlet/outlet opening 14 of the second tank 13b. The nitrogen contained in the second tank 13b is progressively moved into the third tank 13c (FIG. 4). The cold water contained in the third tank 13c exits from the second lower inlet/outlet opening 15 of the third tank 13a and hence exits from the second main inlet/outlet 10 up to complete emptying of the water. The second tank 13b is full of hot water (like the first tank 13a) and the third tank 13c is full of nitrogen (FIG. 5). The storage phase is terminated.

Starting from the configuration of FIG. 5, in the configuration/discharge phase, provision is first of all made for opening the valve for the hot fluid 16 of the second tank 13b and the valve for the cold fluid 17 of the third tank 13c is opened while the remaining valves for the hot fluid and cold fluid 16, 17 are closed (FIG. 6). The cold water coming from the second heat exchanger 4 that flows through the second main inlet/outlet 10 enters through the second lower inlet/outlet opening 15 of the third tank 13c. The nitrogen contained in the third tank 13c is progressively moved into the second tank 13b (FIG. 6). The hot water contained in the second tank 13b exits from the first lower inlet/outlet opening 14 of the second tank 13b and hence exits from the first main inlet/outlet 9 in order to then flow through the second heat exchanger 4, where it transfers heat to the heat user 5 (Organic Rankine Cycle machine). Once the second tank 13b is emptied of the hot water and filled with the nitrogen, the valve for the hot fluid 16 of the first tank 13a and the valve for the cold fluid 17 of the second tank 13b are opened while the remaining valves for the hot fluid and cold fluid 16, 17 are closed, so as to fill the second tank 13b with the cold water and to fill the first tank 13a with the nitrogen, returning the plant into the configuration of FIG. 1.

Figure 7:
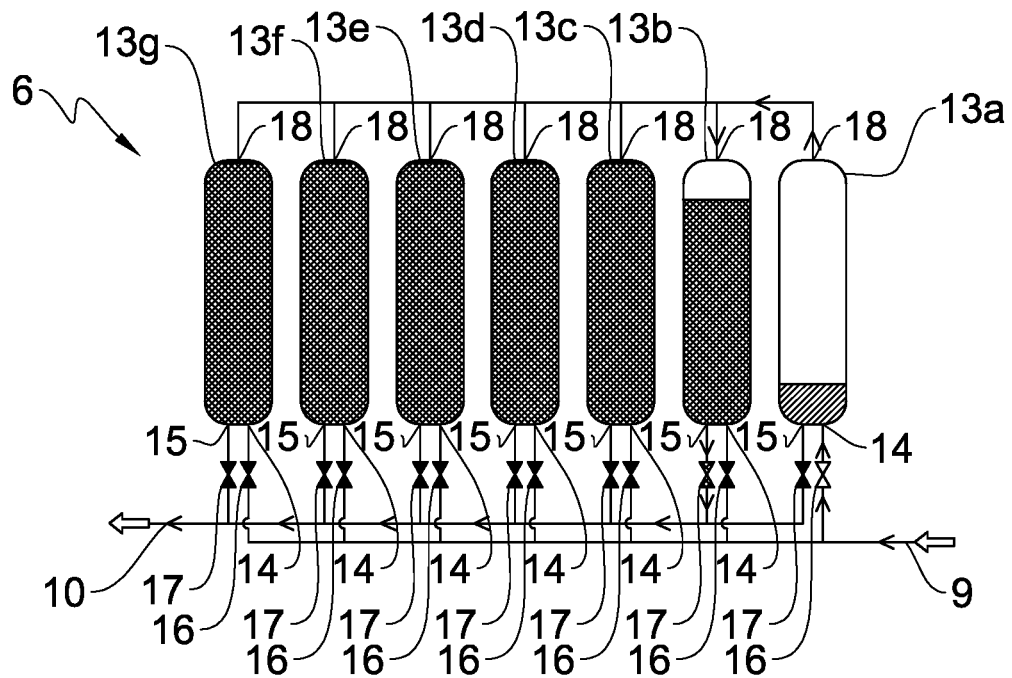
FIG. 7 illustrates a variant of the storage device of the plant pursuant to the preceding figures in the storage configuration.

FIG. 7 illustrates a variant of the storage device 6 of FIGS. 1-6 which comprises seven sections/tanks 13a-13g (with N=6 and B=1) instead of only three, in a storage phase. In the example of FIG. 7, the storage device 6 contains a volume of water substantially equal to six times the containment volume V of each tank and a volume of nitrogen substantially equal to the containment volume V of a single tank. The operation is the same described above.

Figure 8:
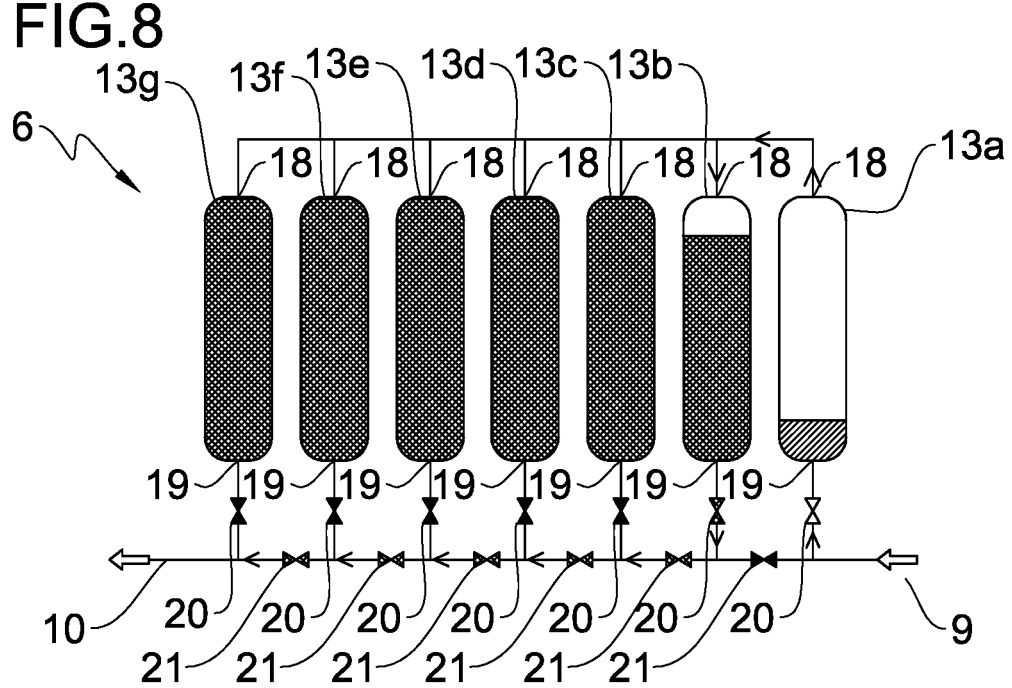
FIGS. 8, 9 and 10 illustrate a different embodiment of the storage device of the plant pursuant to the preceding figures in successive storage phases.
Figure 9:
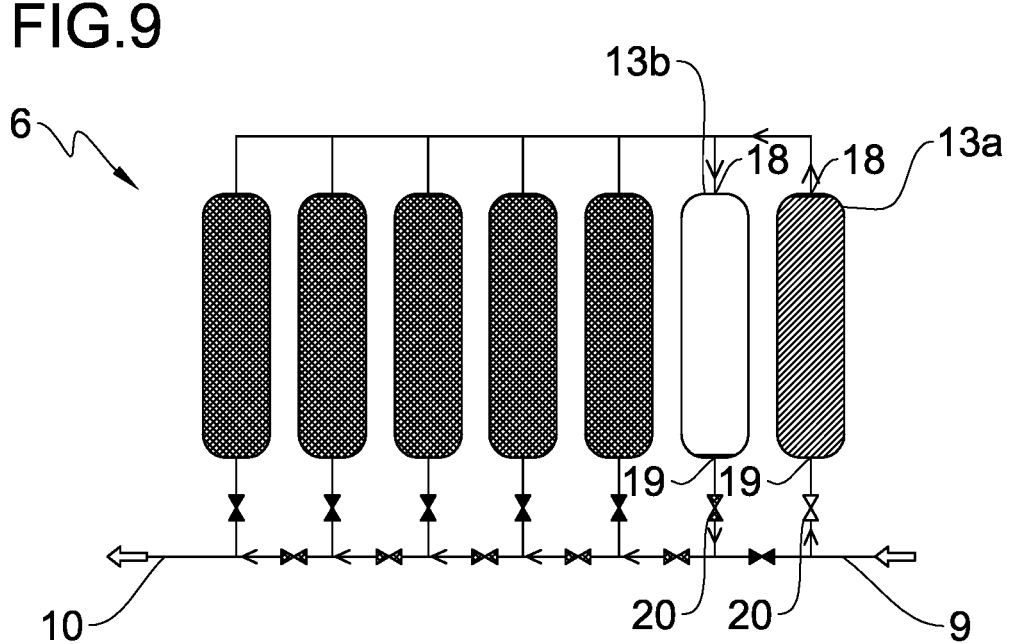
Figure 10:
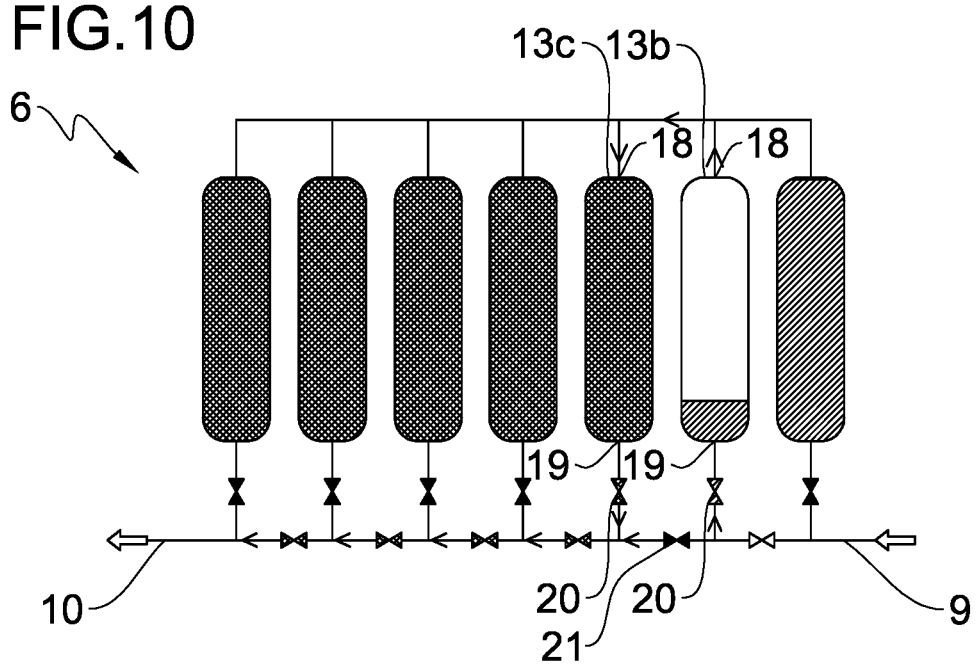

FIGS. 8, 9 and 10 illustrate a different embodiment of the storage device 6 which comprises seven tanks 13a-13g, as in the variant of FIG. 7. Unlike the variant of FIG. 7, the storage device 6 of FIGS. 8, 9 and 10 has a single section/duct of the circuit which is extended below the tanks 13a-13g between the first main inlet/outlet 9 and the second main inlet/outlet 10. Each tank 13a-13g has a single lower inlet/outlet opening 19 and all the lower inlet/outlet openings 19 are connected in parallel to such single section. A first valve 20 is operatively associated with each lower inlet/outlet opening 19 (upstream of the single section). Second valves 21 are operatively associated with said single section and each second valve 21 is operatively interposed between two subsequent lower inlet/outlet openings 19.

FIG. 8 illustrates the storage device 6 when the plant 1 is in the configuration/storage phase. The first valve 20 of the first tank 13a is open, the first valve 20 of the second tank 13b is open while the remaining first valves 20 are closed. In addition, the second valve 21 interposed between the first tank 13a and the second tank 13b, i.e. between the first valves 20 of the first tank 13a and of the second tank 13b, is closed while the remaining second valves 21 are opened. In accordance with the process according to the invention, the hot water coming from the first heat exchanger 2 that flows through the first main inlet/outlet 9 enters through the single lower inlet/outlet opening 19 of the first tank 13a. The nitrogen contained in the first tank 13a is progressively moved into the second tank 13b. The cold water contained in the second tank 13b exits from the respective single lower inlet/outlet opening 19 and then exits from the second main inlet/outlet 10 up to complete emptying of the water. The first tank 13a is full of hot water and the second tank 13b is full of nitrogen (FIG. 9).

At this point, the first valve 20 of the second tank 13b is opened, the first valve 20 of the third tank 13c is opened while the remaining first valves 20 are closed. In addition, the second valve 21 interposed between the second tank 13b and the third tank 13c, i.e. between the first valves 20 of the second tank 13b and of the third tank 13c, is closed while the remaining second valves 21 are opened (FIG. 10). In this manner, the hot water coming from the first heat exchanger 2 that flows through the first main inlet/outlet 9 enters through the single lower inlet/outlet opening 19 of the second tank 13b. The nitrogen contained in the second tank 13b is progressively moved into the third tank 13c. The cold water contained in the third tank 13c exits from the respective single lower inlet/outlet opening 19 and hence exits from the second main inlet/outlet 10 up to complete emptying of the water. The second tank 13b is full of hot water and the third tank 13c is full of nitrogen. The filling with hot water and the emptying of the cold water continue in this manner, until all the tanks except for the seventh are full of hot water and the seventh tank 13g is full of nitrogen. In the configuration/discharge phase, the steps just described above are executed in reverse order.

Figure 11:
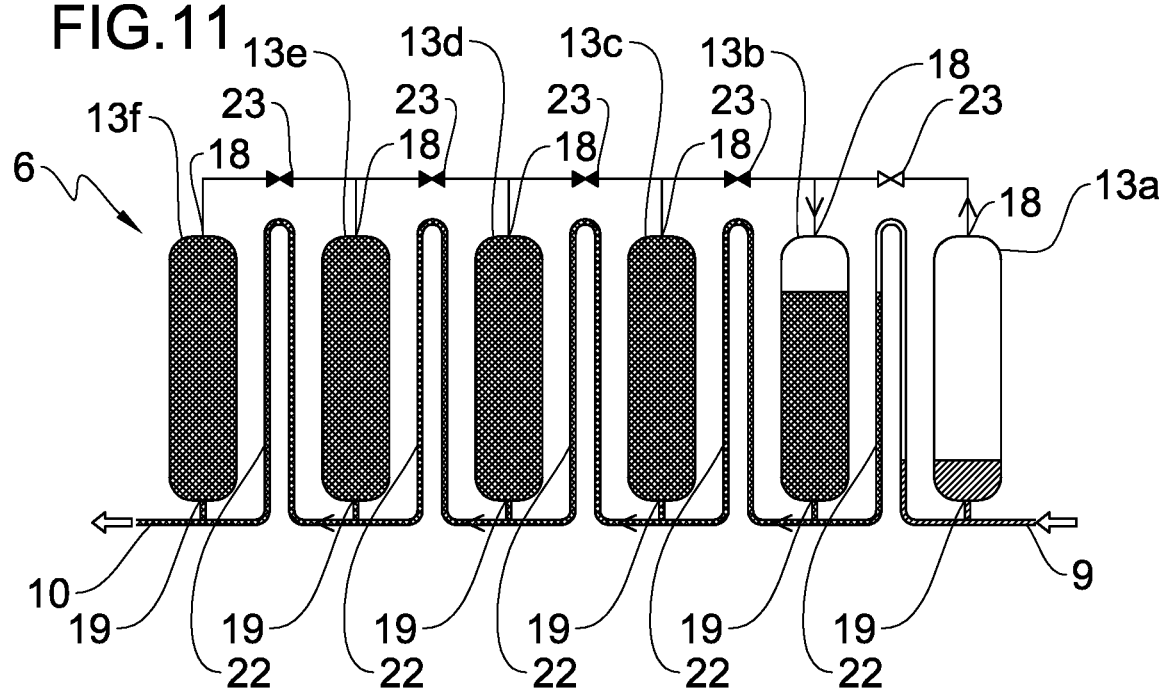
FIGS. 11 and 12 illustrate a further embodiment of the storage device of the plant pursuant to the preceding figures in successive storage phases.
Figure 12:
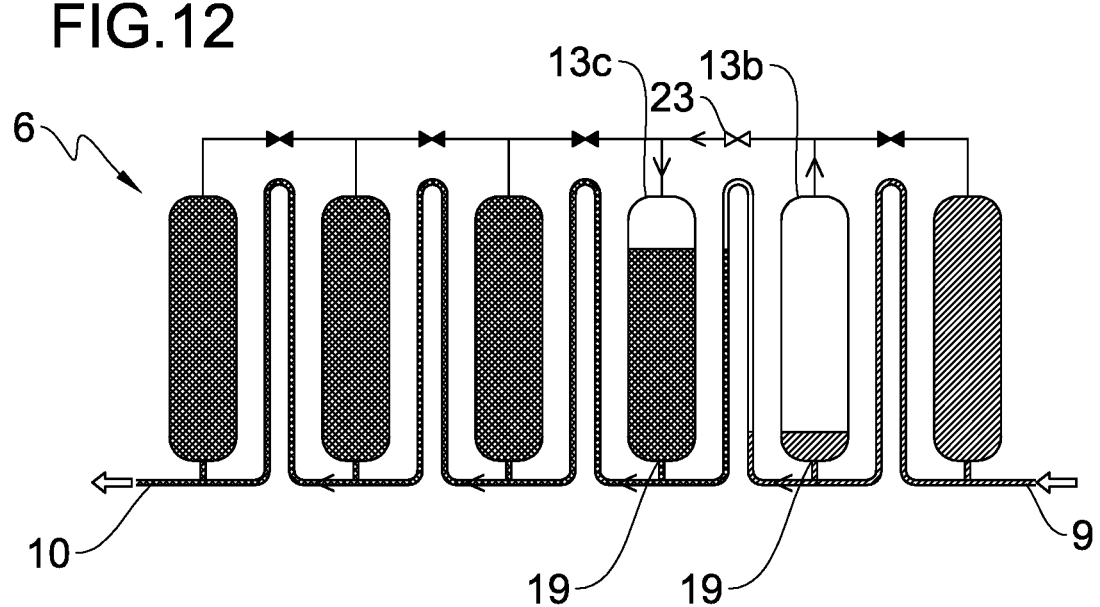

FIGS. 11 and 12 illustrate a further embodiment of the plant provided with six tanks 13a-13f (N=5 and B=1). The storage device 6 contains a volume of water substantially equal to five times the containment volume V of each tank and a volume of nitrogen substantially equal to the containment volume V of a single tank. Unlike the embodiment of FIGS. 8, 9, 10, the lower inlet/outlet openings 19 are not coupled to valves and not even the single section has valves. Said single section forms, between one tank and the next, a siphon 22 which comprises an ascending section, a descending section and an upper curved connector and has a maximum height (where the curved connector is situated) greater than a height of the tanks 13a-13g. Between an upper inlet/outlet opening 18 and that adjacent, a gas valve 23 is situated. In addition, in this embodiment, the nitrogen separates the hot water from the cold water also within the siphon 22.

In the configuration/storage phase of FIG. 11, the gas valve 23 situated between the first tank 13a and the second tank 13b is open while the other gas valves 23 are closed. In accordance with the process according to the invention, the hot water coming from the first heat exchanger 2 that flows through the first main inlet/outlet 9 enters through the single lower inlet/outlet opening 19 of the first tank 13a. The nitrogen contained in the first tank 13a is progressively moved into the second tank 13b through the abovementioned gas valve 23. The cold water contained in the second tank 13b exits from the respective single lower inlet/outlet opening 19, follows the sequence of siphons 22 and then exits from the second main inlet/outlet 10 up to complete emptying of the water from the second tank 13b (which therefore is full of nitrogen). In order to fill the second tank 13b with hot water and empty the third tank 13c of the cold water, provision is made for closing the gas valve 23 situated between the first tank 13a and the second tank 13b and for opening the gas valve 23 situated between the second tank 13b and the third tank 13c. Proceeding in this manner, five of the six tanks are filled, while at the end of storage the sixth tank 13f is full of nitrogen. In the configuration/discharge phase, the above-described steps are executed in reverse order.

The further embodiment of the storage device 6 of the plant 1 is similar to those of FIGS. 8, 9 and 10 but there are eight tanks 13a-13h (N=7 and B=1) and, in place of the valves 20, 21 situated on the single sections or on the single section, a single distributor valve 24, 25 is present. The storage device 6 contains a volume of water substantially equal to seven times the containment volume V of each tank and a volume of nitrogen substantially equal to the containment volume V of a single tank. All the single lower inlet/outlet openings 19 are connected to the distributor valve 24, 25.

The distributor valve 24 illustrated in FIGS. 13, 14, 15 and 16 is of rotary type and comprises a fixed body 26 comprising eight radial inlets/outlets 27, each connected to the single lower inlet/outlet opening 19 of a respective tank 13a-13g. The fixed body 26 also has an inlet/outlet 28 connected to the hot branch 7 of the circuit through the first main inlet/outlet 9 and an inlet/outlet 29 connected to the cold branch 8 of the circuit through the second main inlet/outlet 10. The distributor valve 24 comprises a movable body 30 (movable with respect to the fixed body 26), wherein the movable body 30 has internal volumes/ducts configured to place in fluid communication one of said eight inlets/outlets 27 with the inlet/outlet 28 connected to the hot branch 7 and another of said eight inlets/outlets 27 with the inlet/outlet 29 connected to the cold branch 8.

Figure 15:
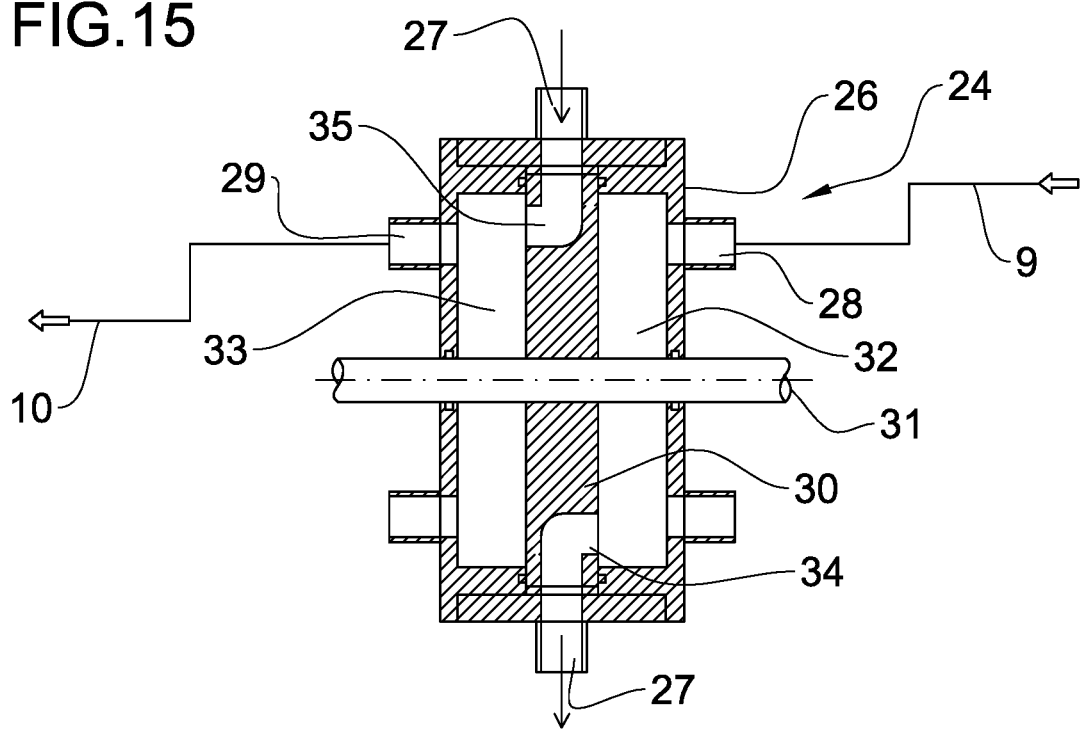
FIGS. 15 and 16 illustrate respective section views of an element of the storage device of FIGS. 13 and 14.
Figure 16:
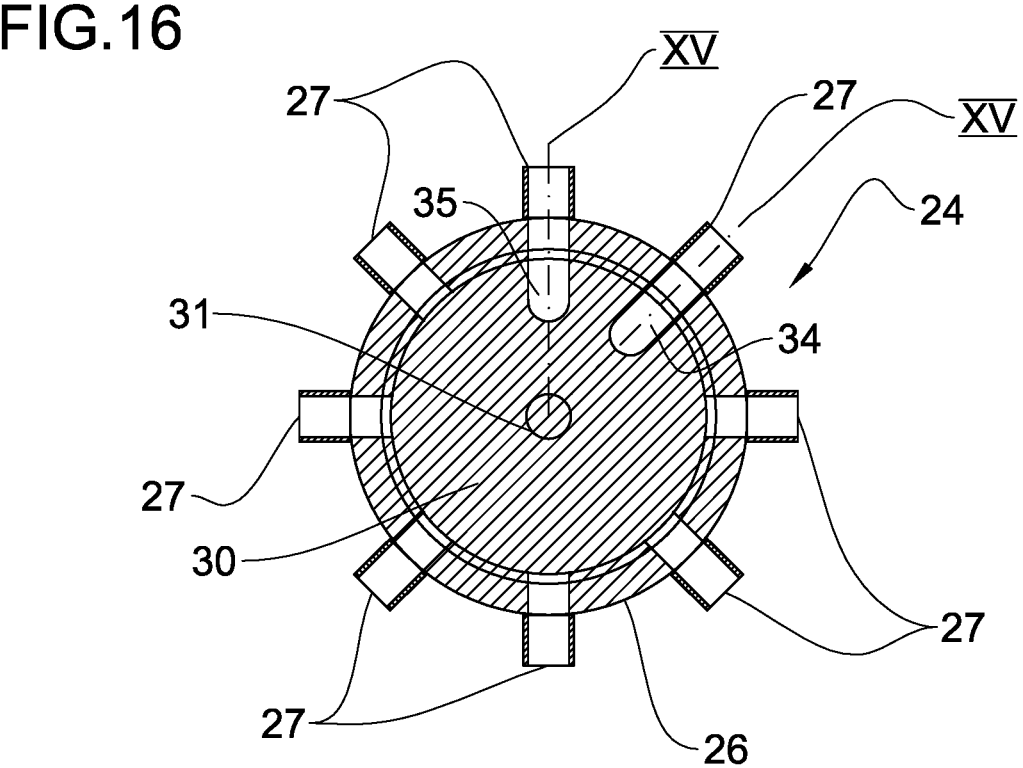

The illustrated movable body 30 is a disc which can rotate around a shaft 31. The fixed body 26 is a box-like cylindrical body. Inside the fixed body 26, the movable body 30 and the fixed body 26 delimit a first chamber 32 and a second chamber 33 separated from each other and placed on opposite sides of the disc. The first chamber 32 has the inlet/outlet 28 connected to the hot branch 7. The second chamber 33 has the inlet/outlet 29 connected to the cold branch 8. The disc has a first elbow duct 34 which is opened into the first chamber 32 and on a peripheral edge of the disc itself, so as to enter into fluid communication with one of the eight radial inlets/outlets 27 at a time. The disc has a second elbow duct 35 which is opened into the second chamber 32, and on the peripheral edge of the disc itself, so as to enter into fluid communication with one of the eight radial inlets/outlets 27 at a time. The first elbow duct 34 and the second elbow duct 35 are angularly offset by an eighth of a perigon (45°), as illustrated in FIG. 6. FIG. 15 is a section according to planes XV-XV of FIG. 16. A distance between two successive inlets/outlets of said eight inlets/outlets is greater than a diameter of the passage of said inlets/outlets, so as to prevent the mixing of the hot water with the cold water.

Figure 13:
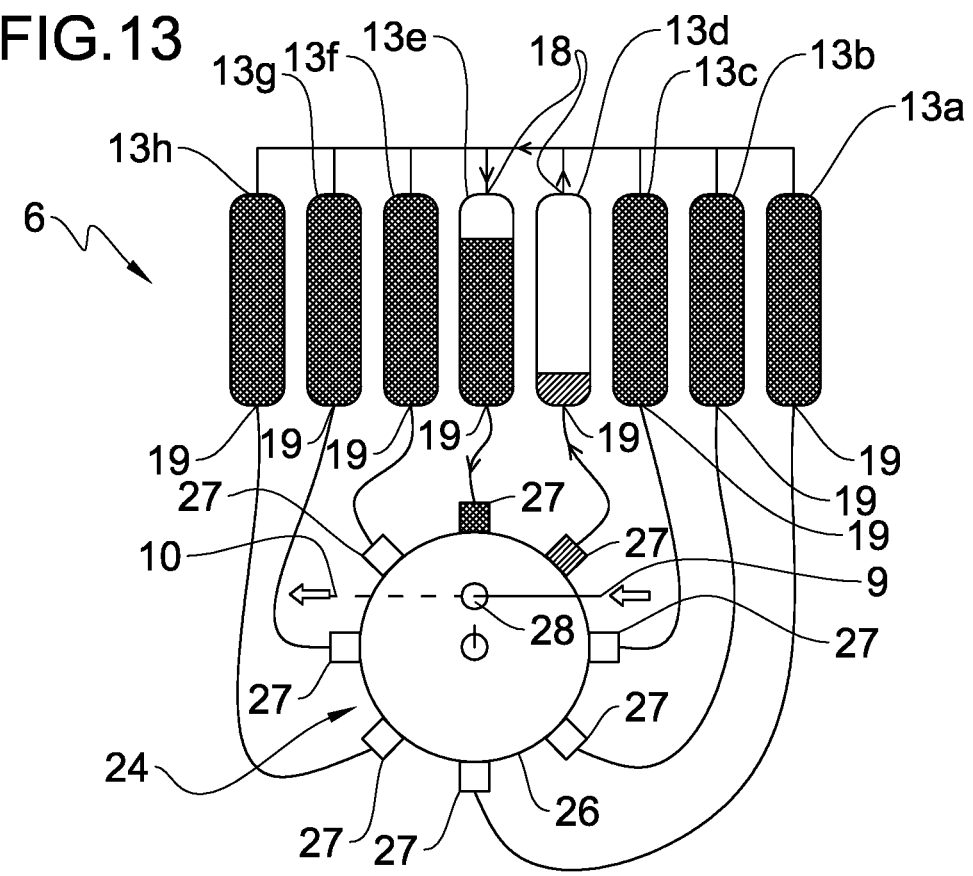
FIGS. 13 and 14 illustrate a further embodiment of the storage device of the plant pursuant to the preceding figures in successive storage phases.
Figure 14:
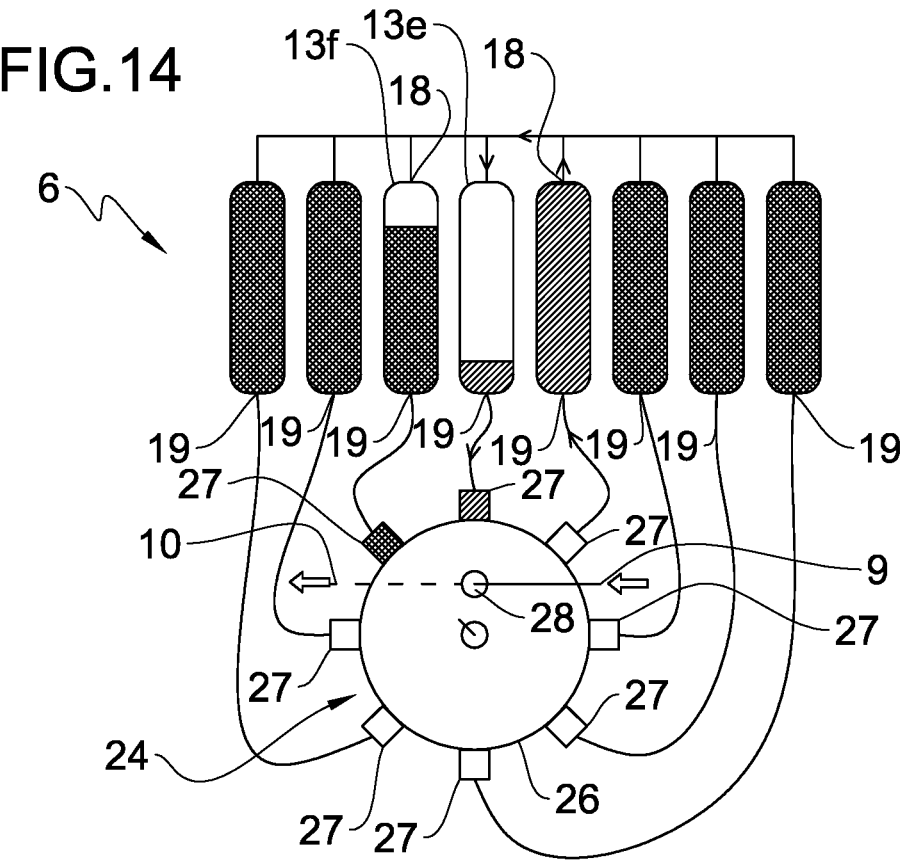

In the configuration/storage phase illustrated in FIG. 13, the first elbow duct 34 is connected to the radial inlet/outlet 27 connected to the fourth tank 13d, the second elbow duct 35 is connected to the radial inlet/outlet 27 connected to the fifth tank 13e. The hot water coming from the first heat exchanger 2 that flows through the first main inlet/outlet 9 enters into the inlet/outlet 28 connected to the hot branch, in the first chamber 32 and then flows through the radial inlet/outlet 27 connected to the fourth tank 13*d* and within said fourth tank 13*d*. The nitrogen contained in the fourth tank 13*d* is progressively moved into the fifth tank 13*e*. The cold water contained in the fifth tank 13*e* exits from the respective single lower inlet/outlet opening 19 and then through the radial inlet/outlet 27 connected to the fifth tank 13*e*, in the second chamber 33, through the inlet/outlet 29 connected to the cold branch 8 and then exits from the second main inlet/outlet 10 up to complete emptying of the water from the fifth tank 13*e*.

At this point, the disc is rotated 45° in counter-clockwise sense (FIGS. 13 and 14), in a manner such that the distributor valve 24 places in fluid communication the hot branch 7 with the fifth tank 13*e* and the cold branch 8 with the sixth tank 13*f* (FIG. 14) so as to fill the fifth tank 13*e* with hot water and to empty the sixth tank 13*f* of the cold water contained.

Figure 17:
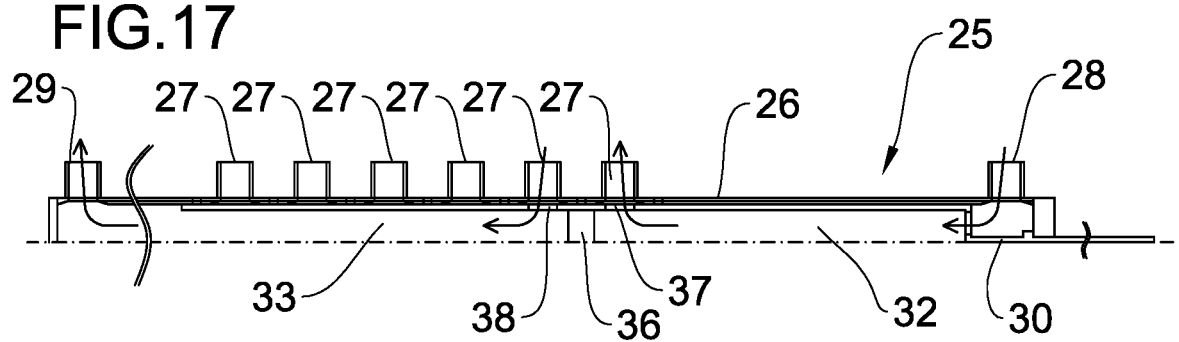
FIGS. 17 and 18 illustrate a variant of the element of FIGS. 15 and 16.
Figure 18:
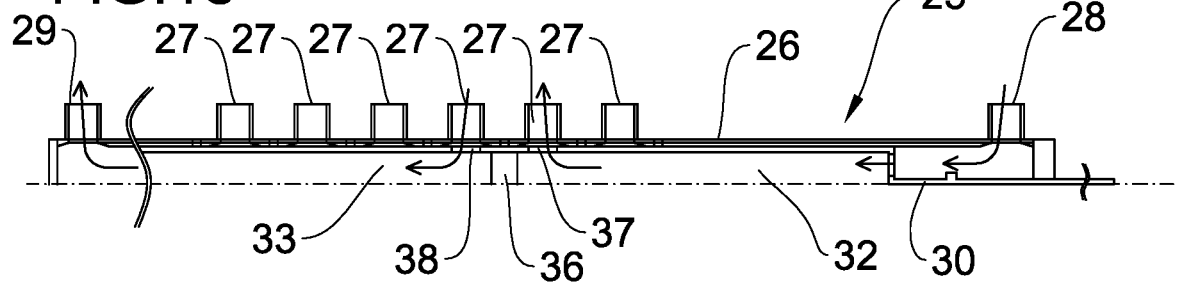

The distributor valve 25 illustrated in FIGS. 17 and 18 is of linear type. The same reference numbers were attributed to the elements of the linear distributor valve 25 that perform the same functions as the elements of the rotary distributor valve 24. The movable body 30 translates within the fixed body 26 and six consecutively aligned inlets/outlets 27 are present. Such inlets/outlets 27 are also aligned with the inlet/outlet 28 connected to the hot branch 7 and with the inlet/outlet 29 connected to the cold branch 8. Also the first chamber 32 and the second chamber 33 are consecutively aligned and separated by a separator 36. In place of the elbow ducts 34, 35, the movable body 30 has a wall adjacent to a wall of the fixed body and having a first hole 37 and a second hole 38. The first hole 37 opens in the first chamber 32 and can be placed in fluid communication with one of the six inlets/outlets 27 at a time. The second hole 38 opens in the second chamber 33 and can be placed in fluid communication with one of the six inlets/outlets 27 at a time.

The use of the distributor valve in accordance with the embodiments of the FIG. 15-18 allows ensuring that the sequence with which the tanks are filled and emptied is always the correct sequence, i.e. it is impossible to open and/or close a wrong valve, as could happen in the plants of FIGS. 1-12.

Figure 19:
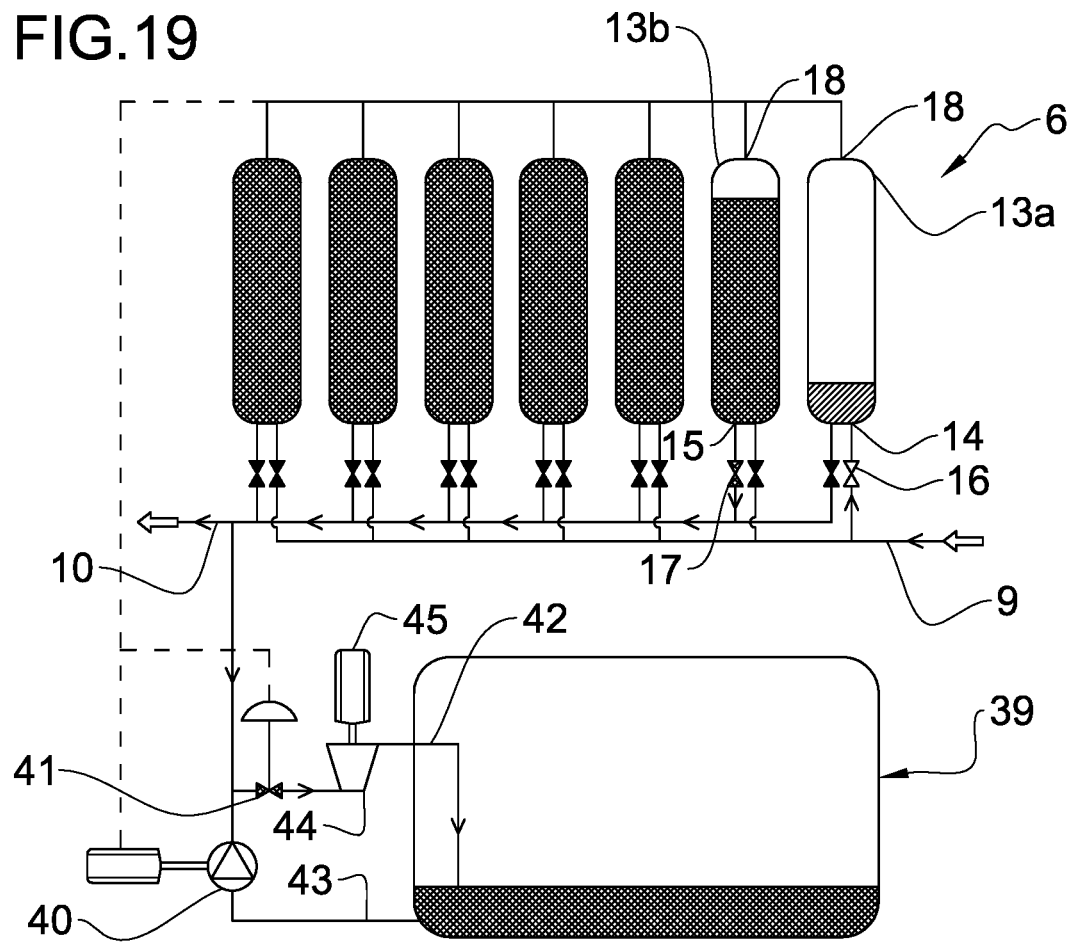
FIG. 19 illustrates a variant of the storage device of FIG. 7 in the storage configuration.
Figure 20:
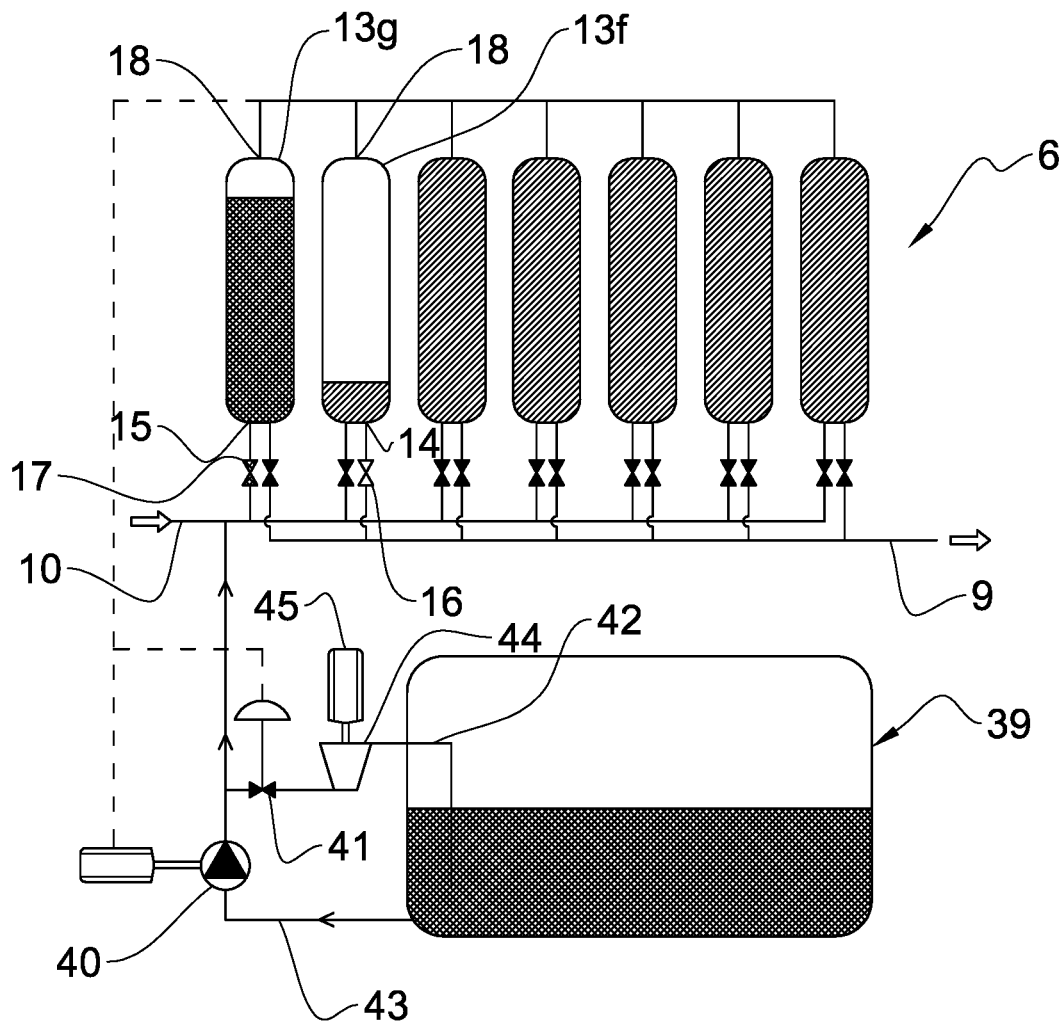
FIG. 20 illustrates the storage device of FIG. 19 in the discharge configuration.

FIGS. 19 and 20 illustrate a variant of the storage device 6 of the plant 1 of FIG. 7 which also comprises a compensation tank 39 connected to the cold branch 8 of the circuit, at the second inlet/outlet 10 and configured to compensate for a different volume of the fluid used at different temperatures. In this manner, the pressure of the compensation gas and its volume are maintained constant. The fluid in a condition thereof at lower density occupies a volume equal to N tanks (six in the embodiment of FIGS. 19 and 20) of the N+B tanks (N=6 and B=1 in the embodiment of FIGS. 19 and 20).

A compensation circuit connects the compensation tank 39 to the cold branch 8 of the circuit and comprises a pump 40 and a discharge valve 41. In the illustrated embodiment, the compensation circuit comprises a first branch 42 provided with the discharge valve 41 and a second branch 43 provided with the pump 40. On the first branch 42, a turbine 44 is also operatively arranged that is connected to a generator 45. The turbine 44 is configured to recover part of the electrical energy expended by the pump 40.

FIG. 19 illustrates the storage device 6 in the same configuration of FIG. 7. In this configuration, the discharge valve 41 is open for introducing, in the compensation tank 39, the cold fluid at higher density (and smaller volume) exiting from the second tank 13*b* while the hot fluid at lower density (and greater volume) is introduced into the first tank 13*a*. The cold fluid also rotates the turbine 44, generating electrical energy by means of the generator 45.

FIG. 20 illustrates the storage device 6 in a discharge configuration similar to that of FIG. 6. In this configuration, the discharge valve 41 is closed, the pump 40 operates in order to pick up, from the compensation tank 39, the cold fluid at higher density (and smaller volume) and introduce it into the seventh tank 13*g* while the hot fluid at lower density (and greater volume) is extracted from the sixth tank 13*f*.

In embodiment variants, provision is made for compensating for the variations of volume of the fluid due to the different temperature without using the compensation tank 39 but rather provision is made, for example, for partly loading or discharging the separation gas G into/from the storage device 6 by means of suitable valves and/or tanks.

In embodiment variants, provision is made for compensating for the variations of volume of the fluid due to the different temperature without using the compensation tank 39 but rather due to a dead volume sufficiently large and to a design of the tanks such to sustain a greater pressure, due to the reduction of volume.

Figure 21A:
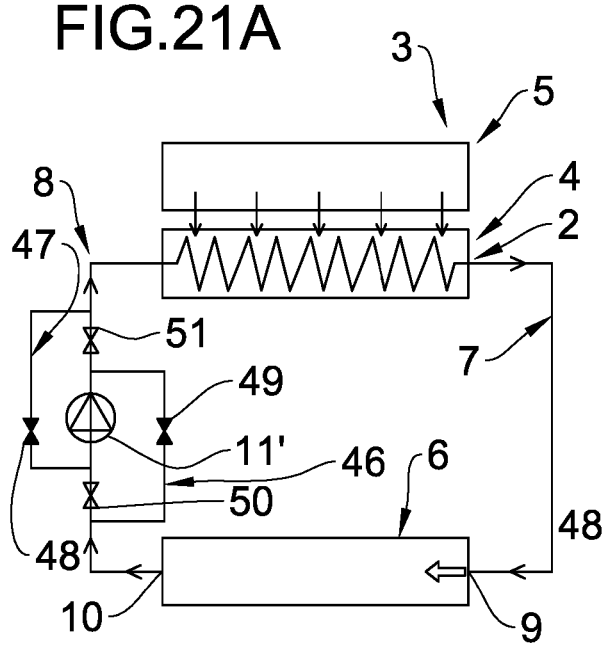
FIGS. 21A and 21B schematically illustrate an alternative embodiment of the plant according to the invention respectively in a storage configuration and in a discharge configuration.
Figure 21B:
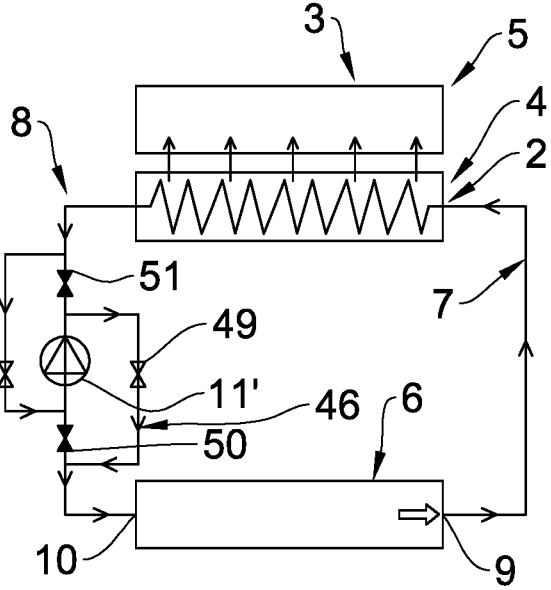
Figure 22A:
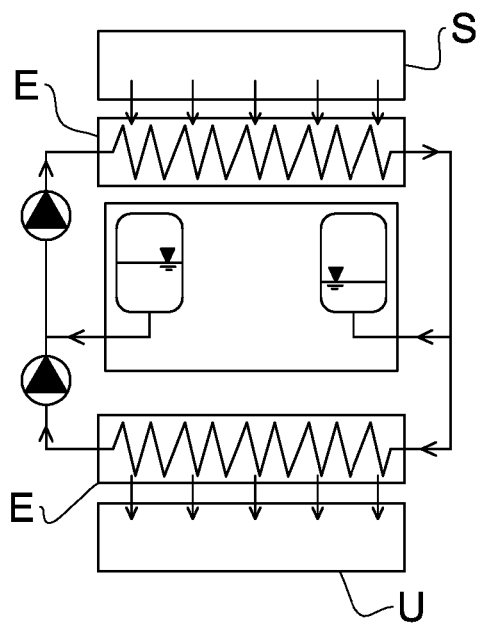
FIGS. 22A and 22B illustrate a plant for storing and discharging thermal energy according to the prior art respectively in a storage configuration and in a discharge configuration.
Figure 22B:
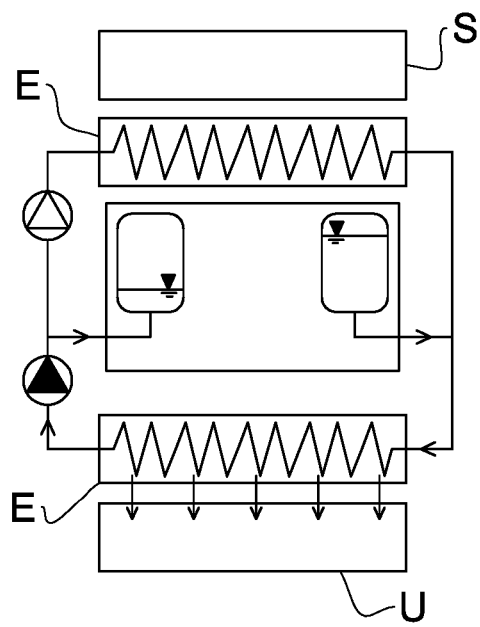

FIGS. 21A and 21B illustrate a different embodiment of the plant 1 in which the storage device 6 according to the invention was only represented schematically and can take on, for example, one of the configurations of FIGS. 1 to 14, 19 and 20. The source 3 and the user 5 are defined by a single system and the plant 1 comprises a single heat exchanger 2, 4 (or an assembly as indicated above) which carries out the function both of first and of second heat exchanger 2, 4, described above. The hot branch 7 is extended between the single heat exchanger 2, 4 and the first inlet/outlet 9 of the storage device 6 and the cold branch 8 is extended between the single heat exchanger 2, 4 and the second inlet/outlet 10 of the storage device 6. The cold branch 8 comprises a single pump 11' which is situated on the cold branch and the diverter devices are configured in order to make the fluid flow through the cold branch 8 from the storage device 6 towards the heat exchanger 2, 4 or from the heat exchanger 2, 4 towards the storage device 6 as a function of the operating step/condition. The diverter devices comprise a first bypass branch 46 of the single pump 11' and a second bypass branch 47 of the single pump 11'. A first diverter valve 48 is placed on the first bypass branch 46, a second diverter valve 49 is placed on the second bypass branch 47. A third diverter valve 50 is situated on the cold branch 8, downstream of a delivery of the single pump 11' and between the connections of the first bypass branch 46 and of the second bypass branch 47 in the cold branch 8 situated between the single pump 11' and the single heat exchanger 2, 4. A fourth diverter valve 51 is situated on the cold branch 8, upstream of an inlet of the single pump 11' and between the connections of the first bypass branch 46 and of the second bypass branch 47 in the cold branch 8 situated between the single pump 11' and the storage device 6. The object of the diverter devices is to reverse the suction of the pump 11' with the delivery and vice versa. Alternatively, it is possible to insert a second pump which works in an opposite manner with respect to the first pump.

In the storage phase illustrated in FIG. 21A, the single system transfers heat (i.e. it behaves like source 3). The first and the second diverter valve 48, 49 are closed, the third and the fourth diverter valve 50, 51 are opened. The hot water coming from the single heat exchanger 2, 4 flows through the hot branch 7 and is accumulated in the storage device 6. The cold water coming from the storage device 6 is pumped towards the single heat exchanger 2, 4 through the third and the fourth diverter valve 50, 51.

In the discharge phase illustrated in FIG. 21B, the single system absorbs heat (i.e. it behaves like user 5). The first and the second diverter valves 48, 49 are opened, the third and the fourth diverter valve 50, 51 are closed. The cold water coming from the single heat exchanger 2, 4 is pumped into the storage device 6, passing in succession through the first diverter valve 48, the single pump 11' and the second diverter valve 49. The hot water coming from the storage device 6 flows towards the single heat exchanger 2, 4 through the hot branch 7.

In further embodiment variants, not illustrated, each storage section, rather than being formed by a single tank, is formed by a plurality of tanks that are connected to each other in series and/or in parallel. The tanks constituting one storage section are connected to the tanks of a different storage section by means of a shared connection.

As emerges from the above-illustrated embodiments, the storage device according to the present invention comprises N+B storage sections, where N is equal to or greater than two and B is less than N, e.g. N is equal to ten and B is equal to one. Each of the N+B storage sections has substantially a same containment volume. The fluid F occupies a volume substantially equal to N times the containment volume V and the separation gas G occupies (with B=1) a volume substantially equal to the containment volume.

| List of elements | |
|---|---|
| 1 | plant for storing and discharging thermal energy |
| 2 | first heat exchanger |
| 3 | heat source |
| 4 | second heat exchanger |
| 5 | heat user |
| 6 | storage device |
| 7 | hot branch |
| 8 | cold branch |
| 9 | first main inlet/outlet |
| 10 | second main inlet/outlet |
| 11 | first pump |
| 11' | single pump |
| 12 | second pump |
| 13a, 13b, . . . | storage sections |
| 14 | first lower inlet/outlet opening |
| 15 | second lower inlet/outlet opening |
| 16 | valve for the hot fluid |
| 17 | valve for the cold fluid |
| 18 | upper inlet/outlet opening |
| 19 | single lower inlet/outlet opening |
| 20 | first valve |
| 21 | second valve |
| 22 | siphon |
| 23 | gas valve |
| 24 | rotary distributor valve |
| 25 | linear distributor valve |
| 26 | fixed body |
| 27 | inlets/outlets |
| 28 | hot branch inlet/outlet |
| 29 | cold branch inlet/outlet |
| 30 | movable body |
| 31 | shaft |
| 32 | first chamber |
| 33 | second chamber |
| 34 | first elbow duct |
| 35 | second elbow duct |
| 36 | separator |
| 37 | first hole |
| 38 | second hole |
| 39 | compensation tank |
| 40 | pump |
| 41 | discharge valve |
| 42 | first branch |
| 43 | second branch |
| 44 | turbine |
| 45 | generator |
| 46 | first bypass branch |
| 47 | second bypass branch |
| 48 | first diverter valve |
| 49 | second diverter valve |
| 50 | third diverter valve |
| 51 | fourth diverter valve |

The invention claimed is:

1. A plant for storing and discharging thermal energy, comprising:
   one or more heat exchanger operatively coupled to or capable of being coupled to at least one of:
      one or more heat source, and
      one or more heat user;
   a fluid configured to store thermal energy;
   at least one storage device for the fluid;
   a circuit configured to couple said one or more heat exchanger and said at least one storage device; and
   control elements operatively coupled to the circuit and/or to said at least one storage device and configured to move the fluid, within said one or more heat exchanger and said storage device, optionally without phase change,
   wherein, in a storage phase in which the one or more heat source transfers heat to said one or more heat exchanger, the fluid receives said heat through said one or more heat exchanger, heats up to a higher temperature and is stored in said at least one storage device as hot fluid;
   wherein, in a discharge phase in which the one or more heat source does not produce heat or does not produce enough heat, the fluid transfers the accumulated heat through said one or more heat exchanger to the one or more heat user, cools down to a lower temperature and is stored in said at least one storage device as cold fluid;
   wherein said storage device comprises N+B storage sections;
   wherein N is equal to or greater than two and B is less than N;
   wherein each of said N+B storage sections has substantially a same containment volume;
   wherein said N+B storage sections are fluidly connected to each other;
   wherein the storage device comprises a separation gas inserted in the storage device;
   wherein the fluid occupies a volume substantially equal to N times the containment volume;
   wherein said separation gas is in contact with the fluid and always separates, or is configured to keep always separated, the hot fluid from the cold fluid;
   wherein each storage section has at least one lower inlet/outlet opening connected to the other storage sections and at least one upper inlet/outlet opening connected to the other storage sections;
   wherein the control elements are configured to determine a passage of the fluid through said at least one lower inlet/outlet opening and to determine a passage of the gas through said at least one upper inlet/outlet opening;
   wherein each storage section has a single lower inlet/outlet opening;
   wherein the storage device comprises a plurality of first valves and a plurality of second valves;

wherein a first valve is operatively associated with each lower inlet/outlet opening;
wherein all the lower inlet/outlet openings are connected to a single section of the circuit; and
wherein the second valves are operatively associated with said single section and each second valve is operatively interposed between two successive lower inlet/outlet openings.

2. The plant according to claim 1, wherein the separation gas occupies a volume substantially equal to the containment volume.

3. The plant according to claim 1, wherein N is greater than three.

4. The plant according to claim 1, wherein the fluid is water at a pressure greater than atmospheric pressure.

5. The plant according to claim 1, wherein the separation gas is an inert gas.

6. The plant according to claim 1, wherein each storage section comprises a single tank or a plurality of tanks that are connected to each other.

7. The plant according to claim 1, wherein the lower inlet/outlet openings are connected to said circuit.

8. The plant according to claim 1,
wherein each storage section has a first lower inlet/outlet opening and a second lower inlet/outlet opening;
wherein the first lower inlet/outlet opening is connected to a hot branch of the circuit and the second lower inlet/outlet opening is connected to a cold branch of the circuit; and
wherein the storage device comprises a plurality of valves for the hot fluid and a plurality of valves for the cold fluid, wherein each valve for the hot fluid is operatively associated with each of these first lower inlet/outlet openings and each valve for the cold fluid is operatively associated with each of these second lower inlet/outlet openings.

9. The plant according to claim 1,
wherein said single section forms, between one storage section and the next, a siphon with a height greater than a height of the storage sections; and
wherein the storage device comprises a plurality of gas valves, each one operatively interposed between the upper inlet/outlet openings of adjacent storage sections.

10. The plant according to claim 1,
wherein the storage device comprises a distributor valve;
wherein each storage section has a single lower inlet/outlet opening; and
wherein all the lower inlet/outlet openings are connected to the distributor valve and the distributor valve is connected to a hot branch and to a cold branch of the circuit.

11. The plant according to claim 1, wherein the storage device comprises a compensation tank connected to a branch of the circuit with the fluid at higher density, optionally to the cold branch of the circuit, and configured to compensate for a different fluid volume at different temperatures.

12. A process for storing and discharging thermal energy actuated with the plant according to claim 1,
wherein the process comprises:
preparing said N+B storage sections connected to each other, the fluid being placed in the storage sections and the separation gas being placed in the storage sections; and
wherein, in the storage phase, the process comprises:
passing the fluid through a heat exchanger of said one or more heat exchanger that is operatively coupled to said one or more heat source to heat the fluid;
introducing at least part of the heated fluid into a storage section of said N+B storage sections and simultaneously extracting from one of the other storage sections cold fluid contained in said storage section, said separation gas being in contact with the hot fluid and with the cold fluid and keeping the hot fluid separate from the cold fluid, and, during the introduction of the heated fluid into said storage section, the separation gas flowing into said one of the other storage sections from which the cold fluid has been extracted; and
conveying the cold fluid exiting from said one of the other storage sections into said one or more heat exchanger.

13. The process according to claim 12, wherein, in the discharge phase, the process comprises:
extracting the accumulated hot fluid from one of the storage sections;
conveying the hot fluid through said one or more heat exchanger to release heat to said one or more heat user; and
introducing the cooled fluid just passed through said one or more heat exchanger into one of the other storage sections, during the introduction of the cooled fluid in said one of the other storage sections, the separation gas flowing into said one of the storage sections from which the hot fluid has been extracted.

14. The process according to claim 12, wherein the separation gas always occupies a same dead volume during the process.

15. A plant for storing and discharging thermal energy, comprising:
one or more heat exchanger operatively coupled to or capable of being coupled to at least one of:
one or more heat source, and
one or more heat user;
a fluid configured to store thermal energy;
at least one storage device for the fluid;
a circuit configured to couple said one or more heat exchanger and said at least one storage device; and
control elements operatively coupled to the circuit and/or to said at least one storage device and configured to move the fluid, within said one or more heat exchanger and said storage device, optionally without phase change,
wherein, in a storage phase in which the one or more heat source transfers heat to said one or more heat exchanger, the fluid receives said heat through said one or more heat exchanger, heats up to a higher temperature and is stored in said at least one storage device as hot fluid;
wherein, in a discharge phase in which the one or more heat source does not produce heat or does not produce enough heat, the fluid transfers the accumulated heat through said one or more heat exchanger to the one or more heat user, cools down to a lower temperature and is stored in said at least one storage device as cold fluid;
wherein said storage device comprises N+B storage sections;
wherein N is equal to or greater than two and B is less than N;
wherein each of said N+B storage sections has substantially a same containment volume;
wherein said N+B storage sections are fluidly connected to each other;
wherein the storage device comprises a separation gas inserted in the storage device;

wherein the fluid occupies a volume substantially equal to N times the containment volume;

wherein said separation gas is in contact with the fluid and always separates, or is configured to keep always separated, the hot fluid from the cold fluid;

wherein each storage section has at least one lower inlet/outlet opening connected to the other storage sections and at least one upper inlet/outlet opening connected to the other storage sections;

wherein the control elements are configured to determine a passage of the fluid through said at least one lower inlet/outlet opening and to determine a passage of the gas through said at least one upper inlet/outlet opening;

wherein each storage section has a single lower inlet/outlet opening;

wherein all the lower inlet/outlet openings are connected to a single section of the circuit;

wherein said single section forms, between one storage section and the next, a siphon with a height greater than a height of the storage sections; and wherein the storage device comprises a plurality of gas valves, each one operatively interposed between the upper inlet/outlet openings of adjacent storage sections.

16. A plant for storing and discharging thermal energy, comprising:

one or more heat exchanger operatively coupled to or capable of being coupled to at least one of:
  one or more heat source, and
  one or more heat user;

a fluid configured to store thermal energy;

at least one storage device for the fluid;

a circuit configured to couple said one or more heat exchanger and said at least one storage device; and control elements operatively coupled to the circuit and/or to said at least one storage device and configured to move the fluid, within said one or more heat exchanger and said storage device, optionally without phase change, wherein, in a storage phase in which the one or more heat source transfers heat to said one or more heat exchanger, the fluid receives said heat through said one or more heat exchanger, heats up to a higher temperature and is stored in said at least one storage device as hot fluid;

wherein, in a discharge phase in which the one or more heat source does not produce heat or does not produce enough heat, the fluid transfers the accumulated heat through said one or more heat exchanger to the one or more heat user, cools down to a lower temperature and is stored in said at least one storage device as cold fluid;

wherein said storage device comprises N+B storage sections;

wherein N is equal to or greater than two and B is less than N;

wherein each of said N+B storage sections has substantially a same containment volume;

wherein said N+B storage sections are fluidly connected to each other;

wherein the storage device comprises a separation gas inserted in the storage device;

wherein the fluid occupies a volume substantially equal to N times the containment volume;

wherein said separation gas is in contact with the fluid and always separates, or is configured to keep always separated, the hot fluid from the cold fluid;

wherein each storage section has at least one lower inlet/outlet opening connected to the other storage sections and at least one upper inlet/outlet opening connected to the other storage sections;

wherein the control elements are configured to determine a passage of the fluid through said at least one lower inlet/outlet opening and to determine a passage of the gas through said at least one upper inlet/outlet opening;

wherein the storage device comprises a distributor valve;

wherein each storage section has a single lower inlet/outlet opening; and wherein all the lower inlet/outlet openings are connected to the distributor valve and the distributor valve is connected to a hot branch and to a cold branch of the circuit.

\* \* \* \* \*